(12) United States Patent
Gaur et al.

(10) Patent No.: US 11,917,088 B2
(45) Date of Patent: Feb. 27, 2024

(54) INTEGRATING DEVICE IDENTITY INTO A PERMISSIONING FRAMEWORK OF A BLOCKCHAIN

(71) Applicant: International Business Machines Corporation, Armonk, NY (US)

(72) Inventors: Nitin Gaur, Round Rock, TX (US); Jeronimo Irazabal, Roque Perez (AR); Abhishek Malvankar, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 303 days.

(21) Appl. No.: 17/026,467

(22) Filed: Sep. 21, 2020

(65) Prior Publication Data

US 2022/0094560 A1 Mar. 24, 2022

(51) Int. Cl.
*H04L 9/32* (2006.01)
*H04L 9/08* (2006.01)
*H04L 41/12* (2022.01)
*H04L 67/56* (2022.01)
*H04L 9/00* (2022.01)

(52) U.S. Cl.
CPC .......... *H04L 9/3278* (2013.01); *H04L 9/0894* (2013.01); *H04L 9/3218* (2013.01); *H04L 41/12* (2013.01); *H04L 67/56* (2022.05); *H04L 9/50* (2022.05); *H04L 2209/12* (2013.01)

(58) Field of Classification Search
None
See application file for complete search history.

(56) References Cited

U.S. PATENT DOCUMENTS

| | | | |
|---|---|---|---|
| 9,722,790 B2 | 8/2017 | Ebrahimi | |
| 10,536,437 B2* | 1/2020 | Bellala | H04L 67/12 |
| 10,705,842 B2* | 7/2020 | Suresh | H04L 9/0668 |
| 11,245,514 B1* | 2/2022 | Mao | H04L 9/3239 |
| 11,823,141 B2* | 11/2023 | Wang | H04L 9/3218 |

(Continued)

FOREIGN PATENT DOCUMENTS

| | | |
|---|---|---|
| WO | 2017087397 A1 | 5/2017 |
| WO | 2022058183 A1 | 3/2022 |

OTHER PUBLICATIONS

L. D. Santis, V. Paciello and A. Pietrosanto, "Blockchain-Based Infrastructure to enable Trust in IoT environment," 2020 IEEE International Instrumentation and Measurement Technology Conference (I2MTC), 2020, pp. 1-6, doi: 10.1109/I2MTC43012.2020.9128817.

(Continued)

*Primary Examiner* — Michael W Chao
(74) *Attorney, Agent, or Firm* — Grant Johnson

(57) ABSTRACT

A computer-implemented method for configuring a blockchain network, a computer program product for integrating device identity into a permissioning framework of a blockchain network, and a blockchain network. One embodiment may comprise registering a device at a delineate node of a blockchain network, creating, by a processor of the delineate node based on the registering, a profile for the device; an performing, by the processor of the delineate node, a pass-through service for the device. The registering may include receiving, by a network interface, an immutable device identity from the device.

20 Claims, 19 Drawing Sheets

(56) References Cited

U.S. PATENT DOCUMENTS

| | | | | |
|---|---|---|---|---|
| 2003/0055962 | A1* | 3/2003 | Freund | H04L 63/145 709/225 |
| 2013/0147511 | A1* | 6/2013 | Koeberl | H04L 9/3278 326/8 |
| 2014/0165141 | A1* | 6/2014 | Chellappa | G06F 21/44 726/2 |
| 2014/0189890 | A1* | 7/2014 | Koeberl | G09C 1/00 726/34 |
| 2016/0072632 | A1* | 3/2016 | Blanton | G09C 1/00 713/189 |
| 2016/0080153 | A1* | 3/2016 | Suzuki | G09C 1/00 713/194 |
| 2016/0328713 | A1 | 11/2016 | Ebrahimi | |
| 2017/0302450 | A1 | 10/2017 | Ebrahimi | |
| 2017/0302663 | A1 | 10/2017 | Nainar et al. | |
| 2017/0329954 | A1* | 11/2017 | Lao | G06F 21/73 |
| 2018/0332011 | A1* | 11/2018 | Gray | H04L 9/0841 |
| 2019/0251199 | A1* | 8/2019 | Klianev | G06F 16/2308 |
| 2019/0287105 | A1* | 9/2019 | Fedorov | H04L 9/0637 |
| 2019/0306235 | A1* | 10/2019 | Veale | H04L 9/3239 |
| 2019/0319861 | A1* | 10/2019 | Pan | H04L 9/0637 |
| 2019/0354672 | A1* | 11/2019 | Cambou | H04L 9/3236 |
| 2020/0045019 | A1* | 2/2020 | Huang | H04L 63/0281 |
| 2020/0065300 | A1* | 2/2020 | Yang | G06F 16/2365 |
| 2020/0076624 | A1* | 3/2020 | Cambou | H04L 9/0861 |
| 2020/0119932 | A1* | 4/2020 | Cambou | H04L 9/0861 |
| 2020/0162271 | A1* | 5/2020 | Cambou | H04L 63/0435 |
| 2020/0195645 | A1* | 6/2020 | Wei | H04L 9/3236 |
| 2020/0258061 | A1* | 8/2020 | Beadles | G06Q 20/3678 |
| 2020/0374106 | A1* | 11/2020 | Padmanabhan | G06F 16/1837 |
| 2020/0388366 | A1* | 12/2020 | Ponceleon | G06F 21/602 |
| 2020/0394154 | A1* | 12/2020 | Blackshear | H04L 9/50 |
| 2021/0056548 | A1* | 2/2021 | Monica | G06Q 20/3825 |
| 2021/0097528 | A1* | 4/2021 | Wang | H04L 9/30 |
| 2021/0184833 | A1* | 6/2021 | Srivastava | H04L 9/0618 |
| 2021/0194676 | A1* | 6/2021 | Mandal | H04L 9/0894 |
| 2022/0029969 | A1* | 1/2022 | Kravitz | H04L 9/3252 |
| 2022/0393881 | A1* | 12/2022 | Ow | G06Q 20/3678 |
| 2023/0018800 | A1* | 1/2023 | Beadles | G06Q 20/3678 |
| 2023/0044059 | A1* | 2/2023 | Goeringer | G06F 21/645 |
| 2023/0081607 | A1* | 3/2023 | Aronson | G06F 21/44 713/189 |
| 2023/0216838 | A1* | 7/2023 | Plusquellic | G06F 21/44 726/7 |

OTHER PUBLICATIONS

Patil, Akash & Hamza, Rafik & Hassan, Alzubair & Jiang, Nan & Yan, Hongyang & Li, Jin. (2020). Efficient Privacy-Preserving Authentication Protocol Using PUFs with Blockchain Smart Contracts. Computers & Security. 97. 101958. 10.1016/j.cose.2020. 101958.

PCT/EP2021/074365, International Search Report and Written Opinion, dated Dec. 13, 2021.

"Physical unclonable function," Wikipedia The Free Encyclopedia, Printed Sep. 3, 2020, 8 pages https://en.wikipedia.org/wiki/Physical_unclonable_function.

Omar et al., "Identity Management in IoT Networks Using Blockchain and Smart Contracts," IEEE, 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 30-Aug. 3, 2018, vol. 1, pp. 994-1000, https://ieeexplore.ieee.org/document/8726730.

"Blockchain in Digital Identity," Consensys, Printed Sep. 3, 2020, 13 pages https://consensys.net/blockchain-use-cases/digital-identity/.

Mohanty et al., "PUFchain: Hardware-Assisted Blockchain for Sustainable Simultaneous Device and Data Security In the Internet of Everything (IoE)," Sep. 17, 2019, 37 pages, https://arxiv.org/abs/1909.06496.

"Yubico," About this Product, Printed Sep. 3, 2020, 10 pages, https://www.yubico.com/product/yubihsm-2.

"What is blockchain technology?," IBM, Printed Sep. 3, 2020, 11 pages, https://www.ibm.com/blockchain/what-is-blockchain.

Felicetti C., et al., "Making ioT Services Accountable: A Solution Based on Blockchain and Physically Unclonable Functions," Springer, Internet and Distributed Computing Systems, IDCS 2019, Lecture Notes in Computer Science, vol. 11874, 2019, pp. 294-305.

Patil, Akash Suresh, et al., "Blockchain-PUF-Based Secure Authentication Protocol for Internet of Things," Springer, International Conference on Algorithms and Architectures for Parallel Processing, 2020, pp. 331-338.

Guin, Ujjwal, et al., "Ensuring Proof-of-Authenticity of IoT Edge Devices using Blockchain Technology," 2018 IEEE International Conference on Internet of Things, Green Computing and Communications, Cyber, Physical and Social Computing, Smart Data, Blockchain, Computer and Information Technology, Congress on Cybermatics, 2018, pp. 1042-1049.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

INTEGRATING DEVICE IDENTITY INTO A PERMISSIONING FRAMEWORK OF A BLOCKCHAIN

BACKGROUND

The present disclosure relates to the configuration and management of blockchain networks; and more specifically, to the configuration and management of "Internet of Things" (IoT) devices in a blockchain network.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of this new capability is the blockchain. Blockchain generally refers to a shared, immutable ledger that facilitates the process of recording transactions and tracking assets in a business network. An asset can be tangible (a house, a car, cash, land) or intangible (intellectual property, patents, copyrights, branding). Virtually anything of value can be tracked and traded on a blockchain network, reducing risk and cutting costs for all involved.

SUMMARY

According to embodiments of the present disclosure, a computer-implemented method for configuring a blockchain network, One embodiment may comprise registering a device at a delineate node of a blockchain network, creating, by a processor of the delineate node based on the registering, a profile for the device; an performing, by the processor of the delineate node, a pass-through service for the device. The registering may include receiving, by a network interface, an immutable device identity from the device.

According to embodiments of the present disclosure, a computer program product for integrating device identity into a permissioning framework of a blockchain network. The computer program product may comprise a computer readable storage medium having program instructions embodied therewith. The program instructions may cause the processor to provide, by a node, pass-through security services, register, by the node, a device as a registered node on the blockchain network, create, by the node based on the registering, a virtual profile on the device in a secure enclave, maintain a transaction correlation table for the device, and facilitate, by the node, transaction commitment and client communication for the device. The device in some embodiments may have a physical unclonable function associated therewith. The registering may include the device sending a physical unclonable function challenge response to the node. The pass-through security services may include a trusted registration of peers in a blockchain network. The transaction correlation table may contain a record of blockchain essentials associated with the device, wherein the blockchain essentials include channels, endorsement policies, and delegate authority proofs.

According to embodiments of the present disclosure, a blockchain network. One embodiment may comprise a plurality of relatively lower capability peers and at least one relatively higher capability peer. Each of the relatively lower capability peers may have an immutable device identity associated therewith. The relatively higher capability peer may perform workloads requiring computing capabilities above one or more predefined thresholds on behalf of the plurality of the relatively lower capability peers.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
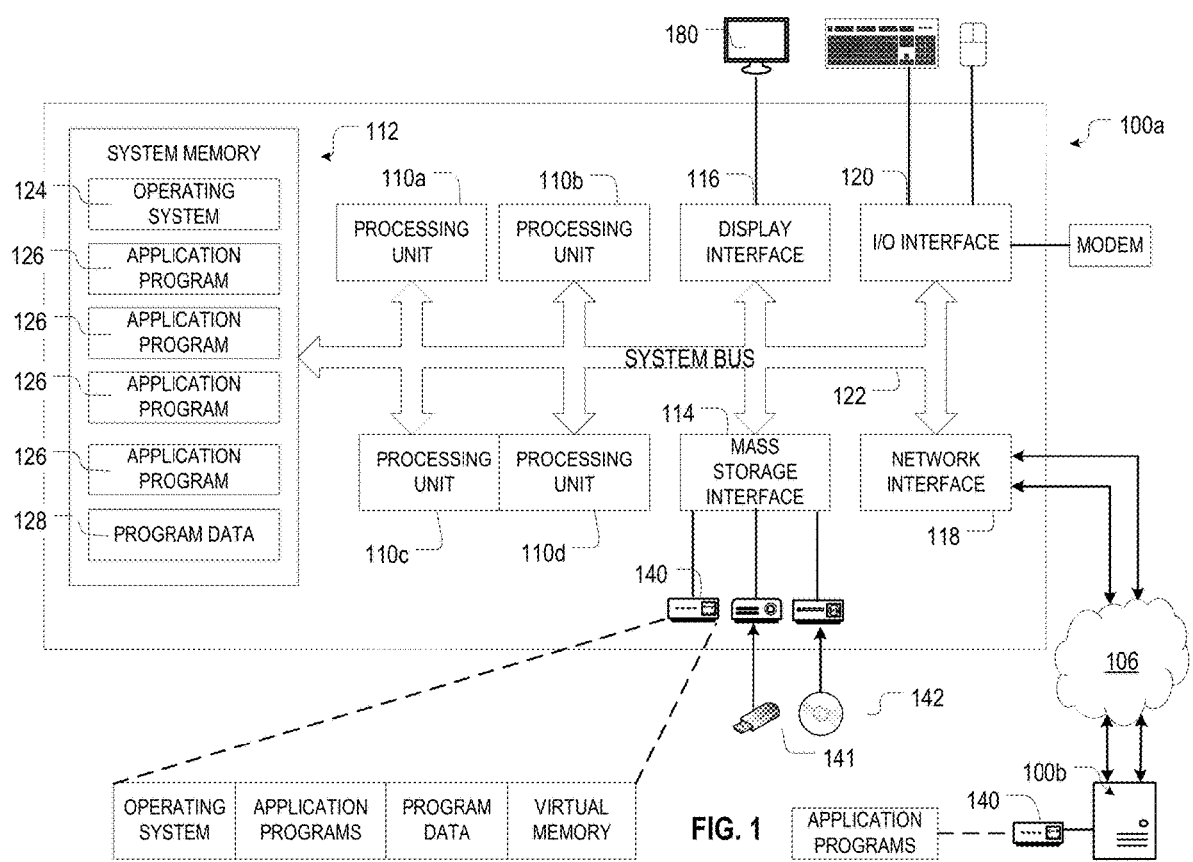
FIG. 1 illustrates an embodiment of a data processing system (DPS), consistent with some embodiments.

While the invention is amenable to various modifications and alternative forms, specifics thereof have been shown by way of example in the drawings and may be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the configuration and management of blockchain networks, more particular aspects relate to the configuration and management of IoT devices in a blockchain network. While the present disclosure is not necessarily limited to such applications, various aspects of the disclosure may be appreciated through a discussion of various examples using this context.

The IoT generally refers to a network of special purpose computing systems e.g., devices, vehicles, signs, buildings, and other objects embedded with electronics, software, sensors, and/or actuators, plus network connectivity, which may enable these systems to collect and exchange data with other IoT devices and/or computer systems. The IoT allows those objects to be sensed or controlled remotely across existing network infrastructure, creating opportunities for more direct integration of the physical world into computer-based systems, and resulting in improved efficiency, accuracy, and economic benefits, in addition to reduced human intervention. When objects in the physical world are augmented with IoT sensors and actuators, the combination becomes an instance of the more general class of cyber-physical systems, also encompassing technologies such as smart grids, virtual power plants, smart homes, intelligent transportation, and smart cities.

The world is currently experiencing a dramatic rise in the number of IoT devices used in commercial, industrial, and private environments. Work environments, industrial environments, home environments, public buildings, city streets, etc., are all increasingly equipped with network enabled devices that are able to connect to other devices, receive commands, transmit information, and perform specific functions. Some estimations predict there will be over 50 billion IoT devices (i.e., intelligent devices that are able to communicate among themselves) eventually.

IoT devices, however, are often designed to be small, cheap, and lightweight. They may also be designed for passive operation (e.g., using only radio energy transmitted by the reader). These constraints typically translate into IoT devices having relatively less local computing capability (e.g., having processor speed, memory size, and/or storage size less than one or more predefined thresholds), particularly as compared to modern laptop computers, smart phones, and server computers (e.g., having processor speed, memory size, and/or storage size greater than one or more predefined thresholds).

This lack of local computing capability may lead to difficulties in processing machine-to-machine (M2M) transactions, such as blockchain network transactions, involving the IoT devices. For example, one significant issue in some types of blockchain networks is establishing the identity and trustworthiness of a new peer device (i.e., an IoT device in this illustrative example). A related problem for some types of blockchain networks may be the registry and central administration of those peer devices. There have been various options explored to solve this problem, ranging from use of identity management for IoT and other devices to verification and validation of the device signatures, but none of these options has proved adequate for lower capability computing systems, like many IoT devices.

Accordingly, some embodiments of the disclosure may provide an immutable device identity, such as a physical unclonable function, that may be integrated into blockchain network's processing node services and/or infrastructure. Some embodiments may employ the immutable device identity as a registration mechanism, and provide pass-through trust services to enable lower computing power devices to participate on the blockchain network. These pass-through services may include registration, endorsement, ledger maintenance, channel definition and maintenance, a database pointer tracking, and a delegate authority proof.

Some embodiments may integrate the immutable device identity into the permissioning framework of the blockchain network with low processing overhead to enable lower power devices, such as IoT devices, to satisfy the requirements for a compute node in a blockchain network. One feature and advantage of these embodiments is that they can enable trust of low power devises and sensors, such as IoT devices, to participate in the blockchain network.

One feature and advantage of these embodiments is that the immutable device identity may automatically provide cryptographic proof for an immutable registration key, which may then be used as an identity mechanism in the blockchain network. A representative node may then be selected as a delineate node, which may use this registration key to authenticate the IoT device and establish trust. Once trust is established, the delineate node may provide pass-through services for and/or on behalf of the IoT device, such as registration with the network, maintaining the distributed ledger on behalf of the IoT device, managing elements of channels, providing endorsement functions, and other client/peer related activities. In this way, some embodiments of this disclosure may improve M2M and/or device-to-device communication, as the delineate node may provide a localized version of transaction processing enabling processing efficiency of the network.

The present disclosure may also improve the efficiency of blockchain networks. The delineate node may act as a specialized node to direct certain performance and computationally intensive workloads (e.g., workloads that require a processor speed, memory size, and/or storage size above one or more predefined thresholds). Some embodiments may further optimize these specialized nodes with hardware configurations and/or co-processors that are specifically designed for those workloads. For example, the delineate nodes may include specialized input/output processors (IOP) to offload some of the communication overhead from the central processing unit (CPU), a larger amount of random access memory for storing a transaction for a large number of IoT devices, and/or a co-processor to perform encryption on behalf of the IoT devices.

While embodiments of this disclosure are generally described with reference to a practical model for M2M and device-to-device (D2D) participation in secure transaction processing among IoT devices, it is capable of being applied to a wide variety of other applications. For example, some embodiments may be used as a various proxy services to extend a permissioned network to the end users/consumers using physical unclonable function (PUF) enabled mobile devices and/or with a corresponding expansion of key management.

Data Processing System

FIG. 1 illustrates an embodiment of a data processing system (DPS) 100a, consistent with some embodiments. The DPS 100a in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100a, and individual components may have greater complexity than represented in FIG. 1.

The data processing system 100a in FIG. 1 comprises a plurality of central processing units 110a-110d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100a to communicate with other DPS 100b over the communications medium 106. The memory 112 also contains an operating system 124, a plurality of application programs 126, and program data 128.

The data processing system 100a embodiment in FIG. 1 is a general-purpose computing device. Accordingly, the processors 110 may be any device capable of executing program instructions stored in the memory 112 and may themselves be constructed from one or more microprocessors and/or integrated circuits. In this embodiment, the DPS 100a contains multiple processors and/or processing cores, as is typical of larger, more capable computer systems; however, in other embodiments the DPS 100a may comprise a single processor system and/or a single processor designed to emulate a multiprocessor system. Further, the processors 110 may be implemented using a number of heterogeneous data processing systems 100a in which a main processor is present with secondary processors on a single chip. As another illustrative example, the processor 110 may be a symmetric multi-processor system containing multiple processors of the same type.

When the data processing system 100a starts up, the associated processor(s) 110 initially execute the program instructions that make up the operating system 124, which manages the physical and logical resources of the DPS 100a. These resources include the memory 112, the mass storage interface 114, the terminal/display interface 116, the network interface 118, and the system bus 122. As with the processor(s) 110, some DPS 100a embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 1, the instructions are stored in a functional form of persistent storage on the direct access storage device 140. These instructions are then loaded into the memory 112 for execution by the processor 110. However, the program code may also be located in a functional form on the computer readable media 142 that is selectively removable and may be loaded onto or transferred to the DPS 100a for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 1 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100a to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS 100a.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the data processing system 100a. These display units 180 may be non-intelligent (i.e., dumb) terminals, such as an LED monitor, or may themselves be fully programmable workstations used to allow IT administrators and customers to communicate with the DPS 100a. Note, however, that while the display interface 116 is provided to support communication with one or more display units 180, the DPS 100a does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100a. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
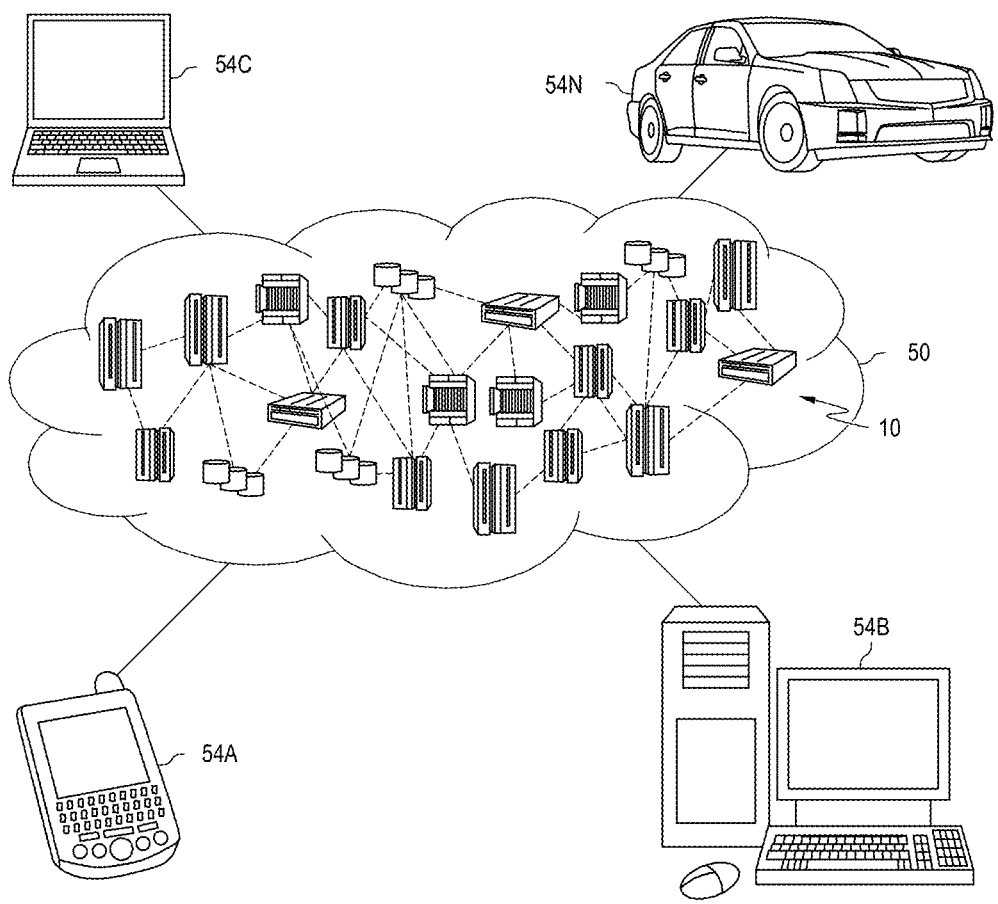
FIG. 2 depicts a cloud computing environment, consistent with some embodiments.

FIG. 2 illustrates a cloud environment containing one or more DPS 100a, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
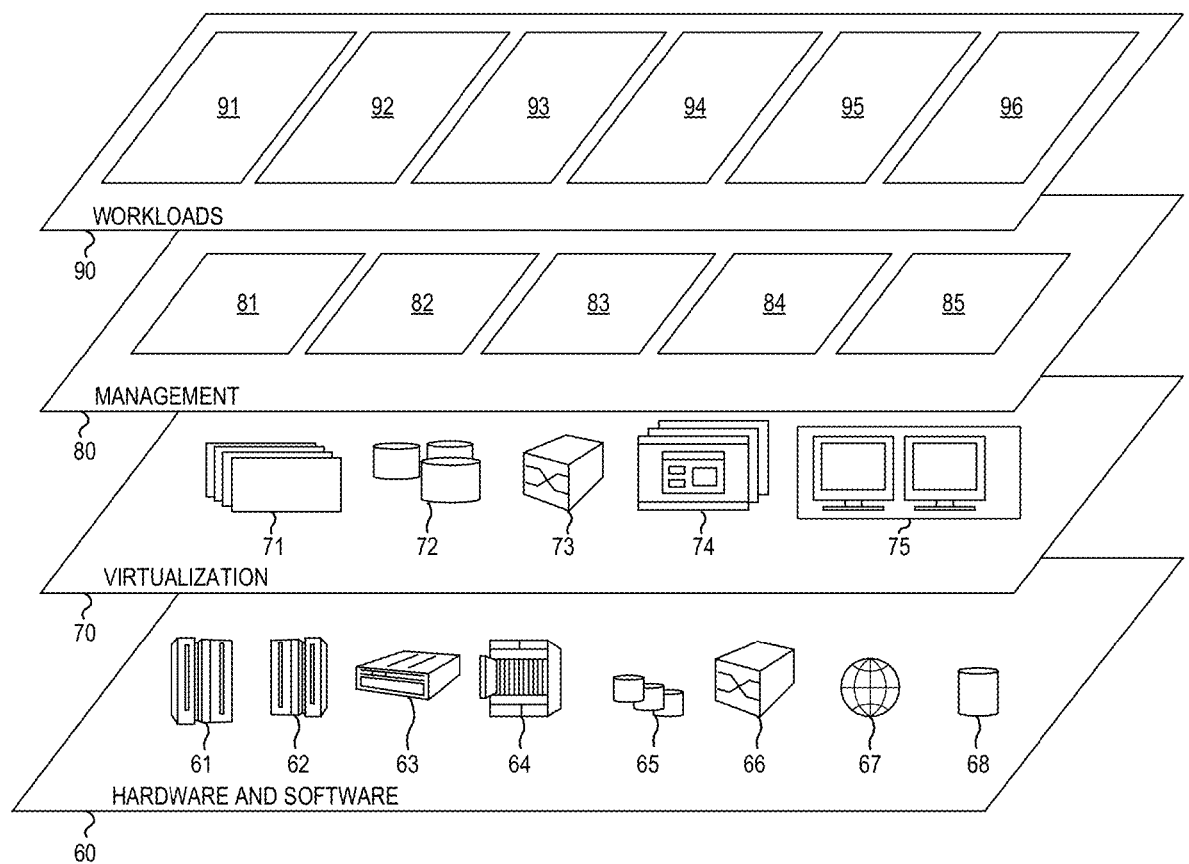
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a blockchain node 96.

Blockchain System

Figure 4:
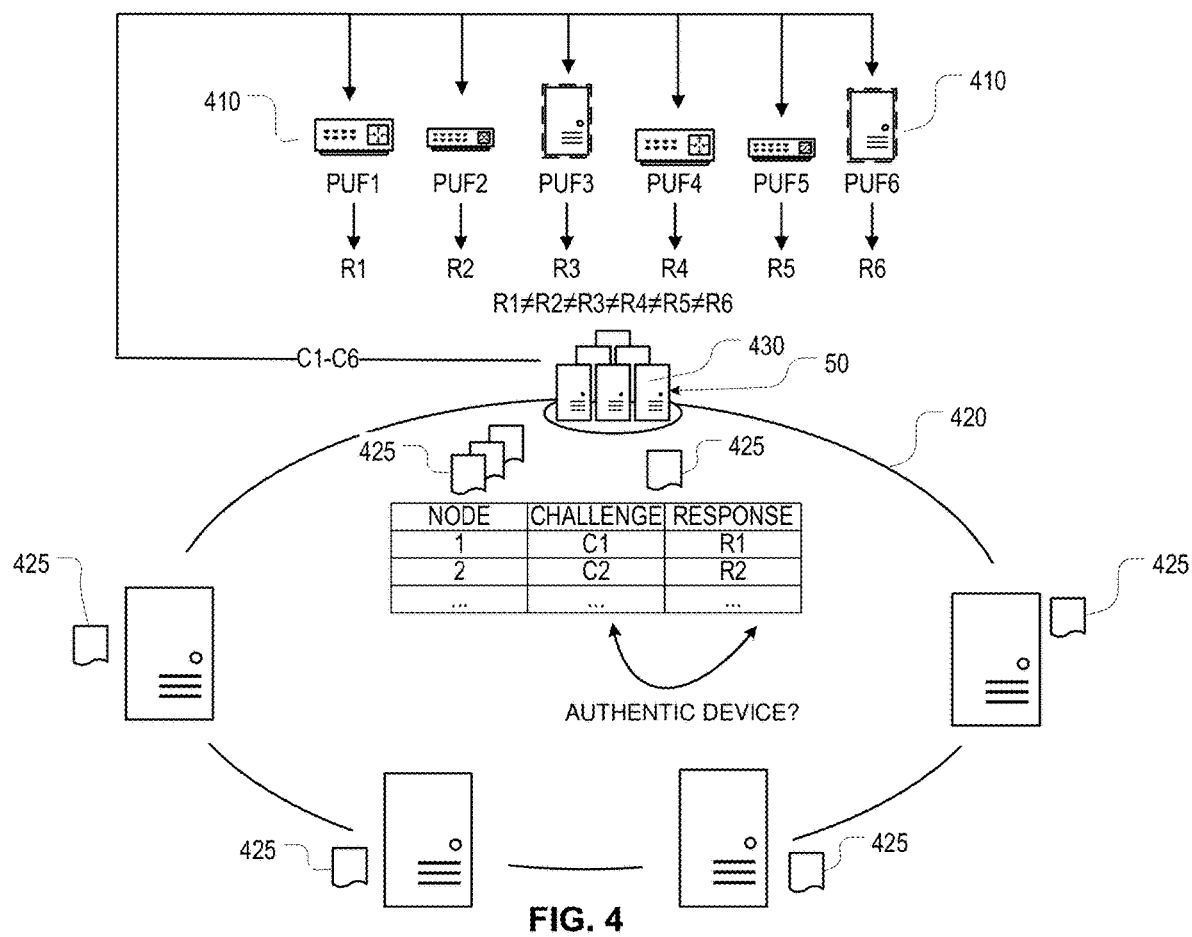
FIG. 4 is a system diagram of one embodiment of a blockchain network, consistent with some embodiments.

FIG. 4 is a system diagram of one embodiment of a blockchain network 400, consistent with some embodiments. Advantageously, the blockchain network 400 in this embodiment may provide a PUF that can automatically provide a cryptographic proof for an immutable registration key, which is used as an identity mechanism in the blockchain. The network 400 may comprise a plurality of relatively lower computing power IoT devices enabled with a PUF (IoT devices) 410 (individually and collectively, only some labeled for clarity); a blockchain network 420 that maintains a distributed ledger 425; and a delineate node 430. The blockchain network 420 in some embodiments may be created using and/or compatible with existing blockchain infrastructure, such as the Hyperledger® framework (Hyperledger is a trademark of the The Linux Foundation). The delineate node 430, in turn, may provide pass-through services for the blockchain network 420, such as a registration with the blockchain network 420, maintaining the distributed ledger 425 on behalf of the registered IoT devices 410, maintaining a transaction correlation table 435 associated with the registered IoT devices 410, providing elements of channels, providing endorsement functions, and other client-related blockchain activities.

The IoT devices 410 in this embodiment may participate in an M2M or device led transaction network, such as the blockchain network 420. The IoT devices 410, in turn, may each be enabled with a PUF, such as SRAM PUF, a delay PUF, a butterfly PUF, a metal resistance PUF, a bistable ring PUF, a DRAM PUF, a digital PUF, an oxide rupture PUF, a coating PUF, a quantum electronic PUF, a magnetic PUF, an optical PUF, a quantum optical PUF, a RF PUF, or the like. The PUF in some embodiments may provide a physically-defined "digital fingerprint" output in response to a given input and conditions (challenge) that can serve as a unique identifier for the IoT device 410.

The blockchain network 420 in this embodiment may include transaction processing infrastructure that will provide trust and transaction processing facilities, including managing of cryptographic artifacts. Nodes 410 on the blockchain network may cooperatively maintain the distributed ledger 425.

The delineate node 430 in this embodiment may be a representative node, typically executing on a DPS 100A having relatively higher computing power in a cloud computing environment 50, that may provide pass-through services, such as a registration with the blockchain network 420 and maintain the distributed ledger 425 on behalf of the relatively lower power IoT devices 410, including, in some embodiments, elements of channels, endorsement functions, and other client-related or peer-related activities.

Delineate node 430 in some embodiments may provide for a unique interface for virtual and secure inter-device communication with reduced communication workload between the IoT devices 410 and blockchain network 420. Accordingly, the delineate node 430 may perform some or all of the following methods:

a. Providers Pass-Through Security Services—this method may range from initial registration of the IoT devices 410 to all communication to/from the IoT devices PUF enabled devices.
  b. Initial Registration—this method allows the IoT device 410 to send the PUF response to the pass-through services to perform the trusted registration with membership services. This method may enable the IoT devices 410 to be registered as a node on the blockchain network 420.
  c. Virtual Secure Profile Creation—upon registration, this method allows a node to create a virtual profile for the IoT device 410 in a secure enclave without having to use a trusted execution environment (TEE), a trusted computing base (TCB), or similar architecture to facilitate security. The virtual profile with all crypto artifacts may be created on the node and these virtual profiles may transact with each other on behalf of IoT devices 410, particularly when the IOT device 410 is low powered.
  d. Secure Key Management—this method provides a secure profile to protect the crypto artifacts, the PUF, and the design calls for a hardware security module (HSM), so the IoT device(s) 410 would not have to be specialized hardware that has a TEE/TCB and HSM enabled, as the PUF-enabled IoT devices 410 are already specialized hardware that has an uncloneable address.

The delineate node 430 may use these methods to maintain a transaction correlation table (not shown). This table may be a tabular form that maintains the record of blockchain network 420 states and configurations, such as channels, endorsement policies, database pointers and delegate authority proofs. The delineate node 430 in this embodiment may also participate in transaction finality. That is, besides acting as a maintainer of crypto artifacts and proxy services, this node 430 may participate in the transaction finality, including transaction commitment and client communication.

The delineate node 430 in some embodiments may also act as a distributed/focalized certificate authority (CA) for a subset of hardware-based identity devices, as well as a proxy against the blockchain network 420, based on public key infrastructure (PKI) membership. The delineate node 430 in these embodiments may both enroll and proxy between hardware-based identity devices and the network. As a result, external certificate authorities may not be aware of such enrolled devices given the distributed nature, temporal enrollment, and considerable number of devices from which transactions will be submitted.

Pass-Through Services

Figure 5:
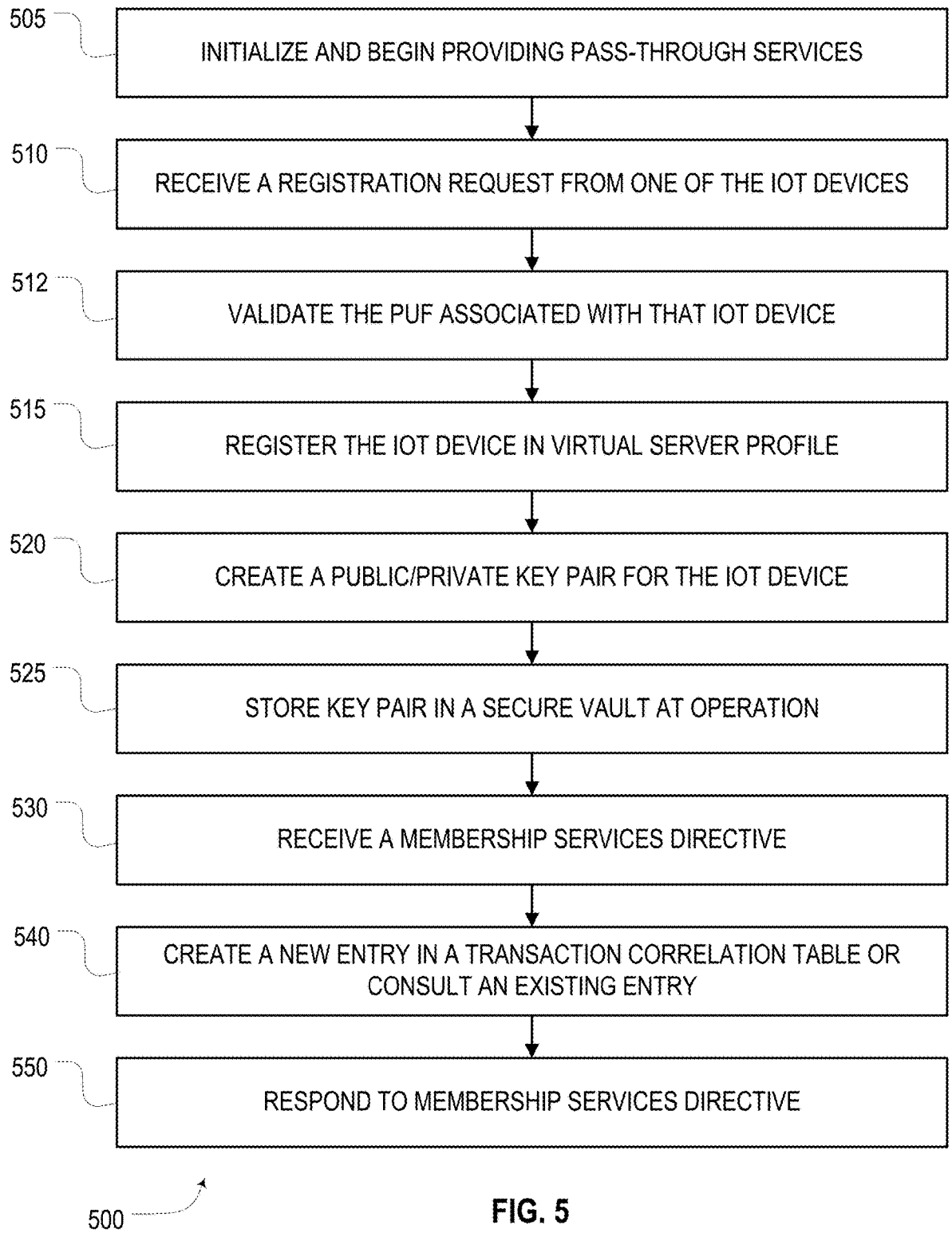
FIG. 5 is a flow chart illustrating one example of pass-through services provided by a delineate node in operation, consistent with some embodiments.

FIG. 5 is a flow chart illustrating one example method 500 of pass-through services provided by a delineate node 430 in operation, consistent with some embodiments. In the embodiment in FIG. 5, the pass thru services may act as one server that all of the IoT and/or low powered PUF devices communicate through, which may simplify for communication and security. The delineate node 430 may registers the device(s), create virtual profile(s), and perform all transactions between virtual profiles etc. More specifically, at operation 505, the delineate node 430 may initialize and begin providing pass-through services. Next, the delineate node 430 may receive a registration request from one of the IoT devices 410 at operation 510. In response, the delineate node may validate the PUF associated with that IoT device 410 at operation 512. In some embodiments, this may include sending a challenge to the IoT device 410 and receiving a response, etc. In some embodiments, the correct response(s) may have been previously measured/calculated by the manufacturer of the IoT device 410 and communicated over an independent, secure channel. In other embodiments, the response is defined as correct and used to prevent future attacks against the blockchain network 420.

Depending on the embodiment, if the challenge/response handshake was successfully validated or successfully completed, the delineate node 430 may register the IoT device 410 in a virtual server profile at operation 515. Optionally, the delineate node 430 may also create a public/private key pair for the IoT device 410 at operation 520 and store the key pair in a secure vault at operation 525.

Next, at operation 530, the delineate node 430 may receive a membership services directive from either one of the IoT device 410 or other nodes in the blockchain network 420. In response, depending on the nature of the request (e.g., whether it is a request to create a new channel or a new communication directed to an existing channel), the delineate node 430 may either create a new entry in a transaction correlation table or consult an existing entry in the transaction correlation table at operation 540. In either case, the delineate node 430 will respond to the membership services directive at operation 550.

Figure 6A:
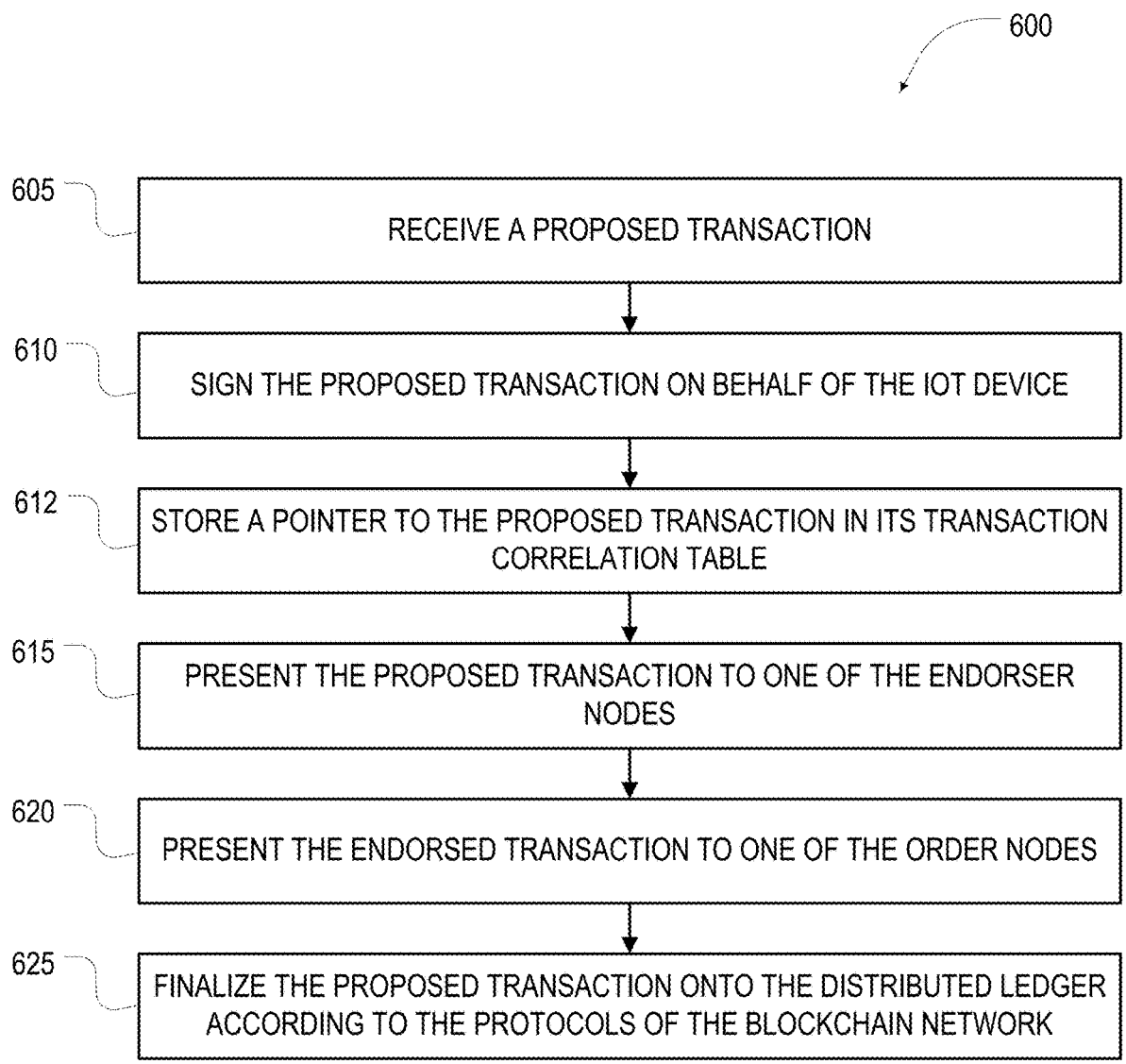
FIG. 6A is a flow chart illustrating another example of pass-through services provided by a delineate node in operation, consistent with some embodiments.

FIG. 6A is a flow chart illustrating another example method 600 of pass-through services provided by a delineate node 430 in operation, consistent with some embodiments. The delineate node 430 in this example acts as a proxy for the IoT devices 410 (i.e., identity peer nodes). At operation 605, the delineate node 430 may receive a proposed transaction from one of the IoT devices 410 to be added to the distributed ledger 425. At operation 610, the delineate node 430 may sign the proposed transaction on behalf of one of the IoT device 410, using its specialized PKI hardware in some embodiments, using a key pair stored in its secure vault that is both associated with one of the IoT devices 410 and signed by a certificate authority. At operation 612, the delineate node 430 may store a pointer to the proposed transaction in its transaction correlation table.

At operation 615, the delineate node 430 may present the proposed transaction to one of the endorser nodes in the blockchain network 420, which will process the proposed transaction normally according to the protocols of the blockchain network 420. This may include using the certificate authority to confirm the identity of the IoT device. Next, at operation 620, the delineate node 430 may present the endorsed transaction to one of the order nodes in the blockchain network 420, which will also process the proposed transaction normally according to the protocols of the blockchain network 420. This may again include confirming the identity of the IoT device 410 using the certificate authority. At operation 625, the blockchain network 420 may finalize the proposed transaction onto the distributed ledger 425, again using the network's normal protocols.

Figure 6B:
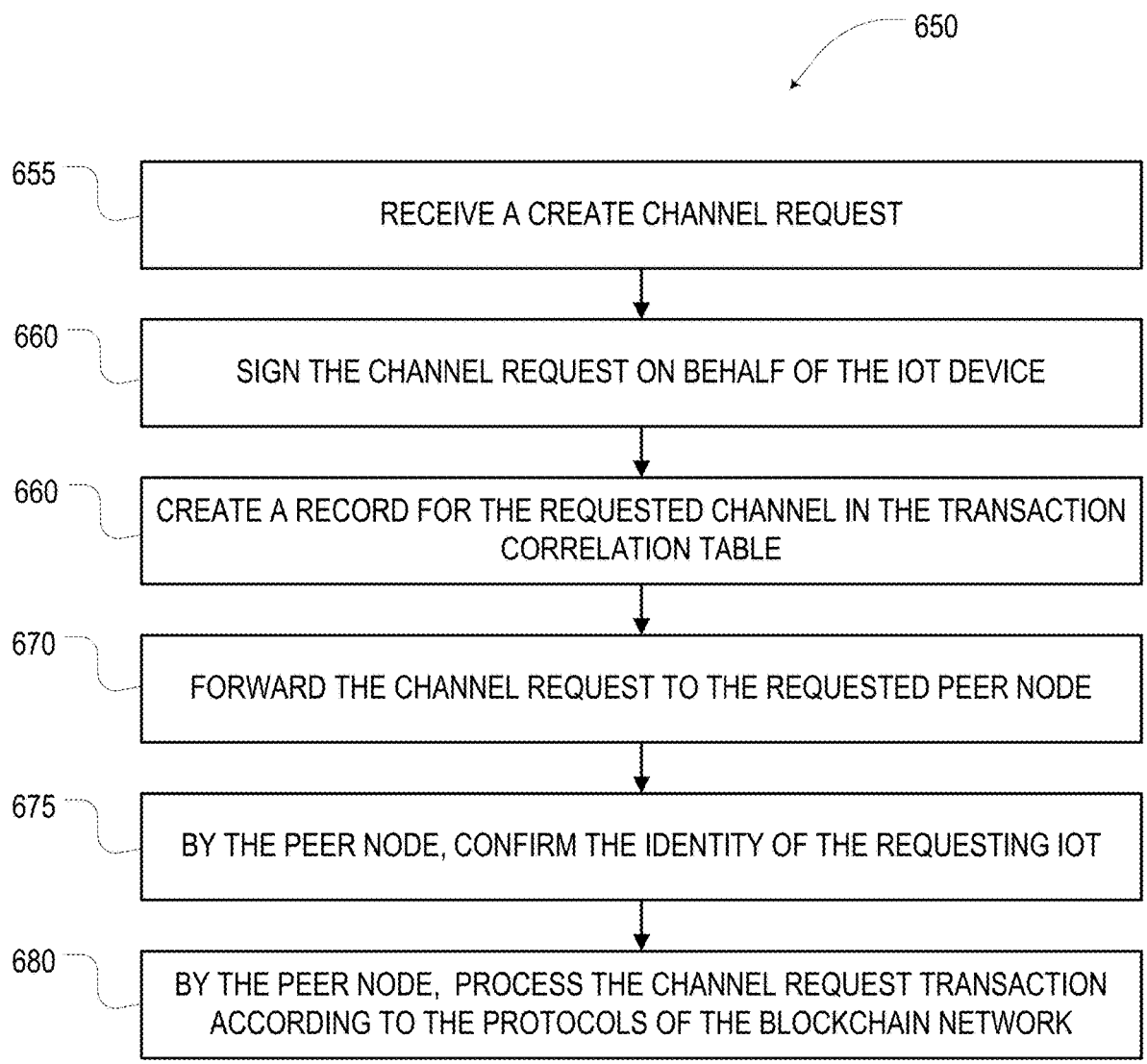
FIG. 6B is a flow chart illustrating another example of pass-through services provided by a delineate node in operation, consistent with some embodiments.

FIG. 6B is a flow chart illustrating another example method 650 of pass-through services provided by a delineate node 430 in operation, consistent with some embodiments. The delineate node 430 in this example acts as a proxy for the IoT devices 410 (i.e., identity peer nodes). At operation 655, the delineate node 430 may receive a create channel request from one of the IoT nodes 410 directed to another peer node on the blockchain network 420. At operation 660, the delineate node 430 may sign the channel request on behalf of the IoT device 410, using its specialized PKI hardware in some embodiments, and using a key pair stored in its secure vault that is both associated with one of the IoT devices 410 and signed by a certificate authority. At operation 665, the delineate node 430 may create a record for the requested channel in its transaction correlation table.

Next, at operation 670, the delineate node 430 may forward the channel request to the requested peer node. The peer node, in turn, may respond by first confirming the identity of the requesting IoT device 410 using the signature and the certificate authority at operation 675. The peer node will then process the channel request transaction normally according to the protocols of the blockchain network 420 at operation 680.

One feature and advantage of these methods is that the delineate node 430 may be transparent to the rest of the blockchain network 420 in some embodiments, including the endorser nodes, the orderer nodes, and the other peer nodes. That is, the other nodes may process the proposed transaction(s) and request(s) as though they came directly from one of the IoT devices 410. Advantageously, this may permit the use of specialized nodes to improve the performance of computationally intensive workloads and/or workflows. Moreover, the delineate node 430 in these embodiments may provide an interface for virtual and secure inter-device communication with reduced communication workload between the IoT devices 410 and the blockchain network 420.

Blockchain Architecture

Figure 7A:
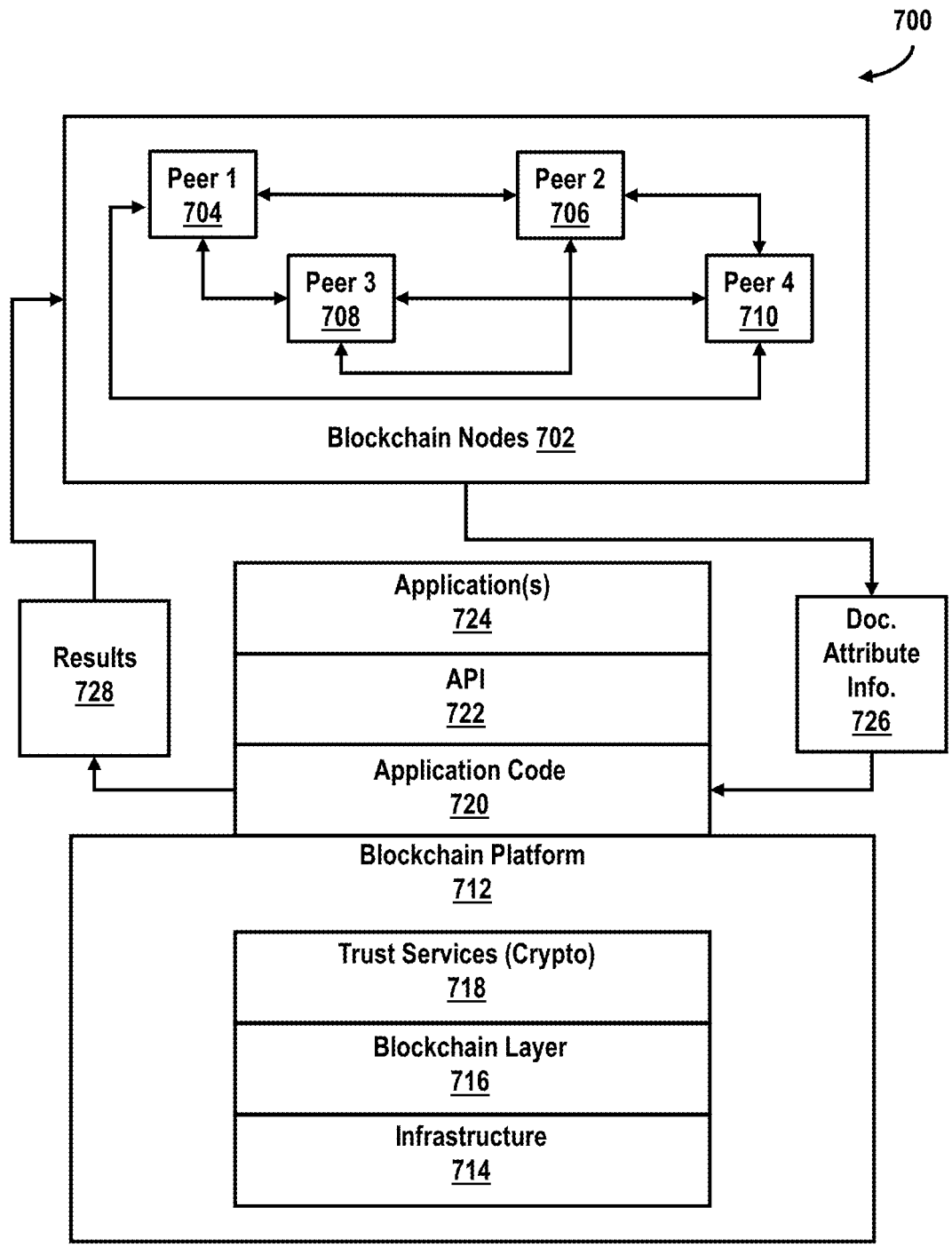
FIG. 7A depicts an example blockchain architecture configuration, consistent with some embodiments.

FIG. 7A illustrates a blockchain architecture configuration 700, consistent with some embodiments. The blockchain architecture 700 in these embodiments may include certain blockchain elements, for example, a group of blockchain nodes 702. The virtual secure profiles created on the delineate node 430 may also act like individual blockchain nodes 720 in some embodiments. The group of blockchain nodes 702, in turn, may include one or more member nodes 704-710 (these four nodes are depicted by example only). These member nodes 704-710 may participate in a number of activities, such as blockchain transaction addition and validation process (consensus). One or more of the member nodes 704-710 may endorse transactions based on endorsement policy and may provide an ordering service for all blockchain nodes in the architecture 700. A member node 704-710 may initiate a blockchain authentication and seek to write to a blockchain immutable ledger stored in blockchain layer 716, a copy of which may also be stored on the underpinning physical infrastructure 714.

The blockchain architecture 700 in some embodiments may include one or more applications 724, which are linked to application programming interfaces (APIs) 722 to access and execute stored program/application code 720 (e.g., chaincode, smart contracts, etc.). The stored program/application code 720, in turn, can be created according to a customized configuration sought by participants and can maintain its own state, control their own assets, and receive external information. The stored program/application code 720 can be deployed as a transaction and installed, via appending to the distributed ledger, on all blockchain nodes 704-710.

A blockchain base or platform 712 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 716 may expose an interface that provides access to the virtual execution environment necessary to process the program code and engage a physical infrastructure 714. Cryptographic trust services 718 may be used to verify transactions such as asset exchange transactions and keep information private.

The blockchain architecture configuration of FIG. 7A may process and execute the program/application code 720 via one or more interfaces exposed, and services provided, by the blockchain platform 712. The program/application code 720 may control blockchain assets. For example, the code 720 can store and transfer data, and may be executed by member nodes 704-710 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 726 may be processed by one or more processing entities (e.g., virtual machines) included in the blockchain layer 716. A result 728 may include a plurality of linked shared documents. The physical infrastructure 714 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code, in some embodiments, may be used to create a temporary data structure in a virtual machine or other computing platforms. Data written to the blockchain in these embodiments may be public or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by the use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 7B:
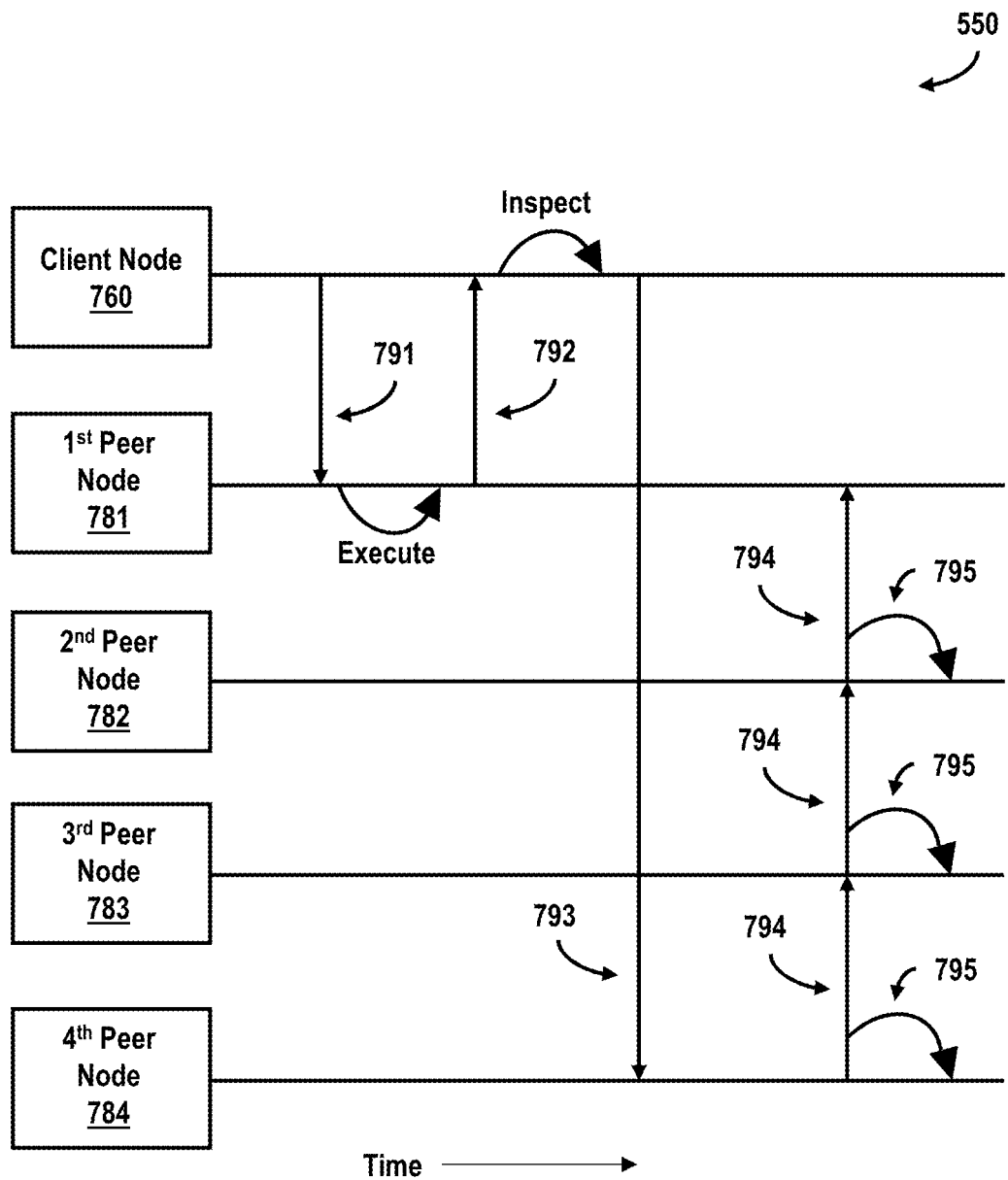
FIG. 7B illustrates a blockchain transactional flow, consistent with some embodiments.

FIG. 7B illustrates an example of a blockchain transactional flow 750 between nodes of the blockchain in accordance with some embodiments. The transaction flow in these embodiments may include a transaction proposal 791 sent by an application client node 760 to an endorsing peer node

781. The endorsing peer 781 may verify the client signature and execute a chaincode function to initiate the transaction. The output may include the chaincode results, a set of key/value versions that were read in the chaincode (read set), and the set of keys/values that were written in chaincode (write set). The proposal response 792 may then be sent back to the client 760, along with an endorsement signature, if approved.

In response, the client 760 may assemble the endorsements into a transaction payload 793 and broadcasts it to an ordering service node 784. The ordering service node 784 may then deliver ordered transactions as blocks to all peers 781-783 on a channel. Before committal to the blockchain, each peer 781-783 may validate the transaction. For example, the peers in some embodiments may check the endorsement policy to ensure that the correct allotment of the specified peers have signed the results and authenticated the signatures against the transaction payload 793.

With continuing reference to FIG. 7B, the client node 760 in some embodiments may initiate the transaction 791 by constructing and sending a request to the peer node 781, which may act an endorser. The client 760 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 781 may verify: (a) that the transaction proposal is well-formed; (b) the transaction has not been submitted already in the past (replay-attack protection); (c) the signature is valid; and (d) that the submitter (client 760, in this example embodiment) is properly authorized to perform the proposed operation on that channel. The endorsing peer node 781 may take the transaction proposal inputs as arguments to the invoked chaincode function. The chaincode may then be executed against a current state database to produce transaction results, including a response value, read set, and write set. In some embodiments, no updates are made to the ledger at this point. Instead, the set of values, along with the endorsing peer node's 781 signature, may be passed back as a proposal response 792 to the SDK of the client 760, which parses the payload for the application to consume.

In response, the application of the client 760 may inspect/verify the endorsing peers' signatures and may compare the proposal responses to determine if the proposal response is the same. If the chaincode only queried the ledger, the application may inspect the query response and would typically not submit the transaction to the ordering service 784. If the client application intends to submit the transaction to the ordering service 784 to update the ledger, the application may determine if the specified endorsement policy has been fulfilled before submitting (i.e., did all peer nodes necessary for the transaction endorse the transaction). Here, the client may include only one of a multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After a successful inspection, in operation 793, the client 760 may assemble endorsements into a transaction and may broadcast the transaction proposal and response within a transaction message to the ordering service 784. The transaction may contain the read/write sets, the endorsing peers' signatures, and a channel ID. The ordering service 784 does not need to inspect the entire content of a transaction in order to perform its operation; instead the ordering service 784 may simply receive transactions from all channels in the network, order them chronologically by channel, and create blocks of transactions per channel.

The blocks of the transaction may be delivered from the ordering service 784 to all peer nodes 781-783 on the channel. The transactions 794 within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 795, each peer node 781-783 may append the block to the channel's chain, and for each valid transaction, the write sets are committed to the current state database. An event may be emitted to notify the client application that the transaction (invocation) has been immutably appended to the chain, as well as to notify whether the transaction was validated or invalidated.

Permissioned Blockchains

Figure 8A:
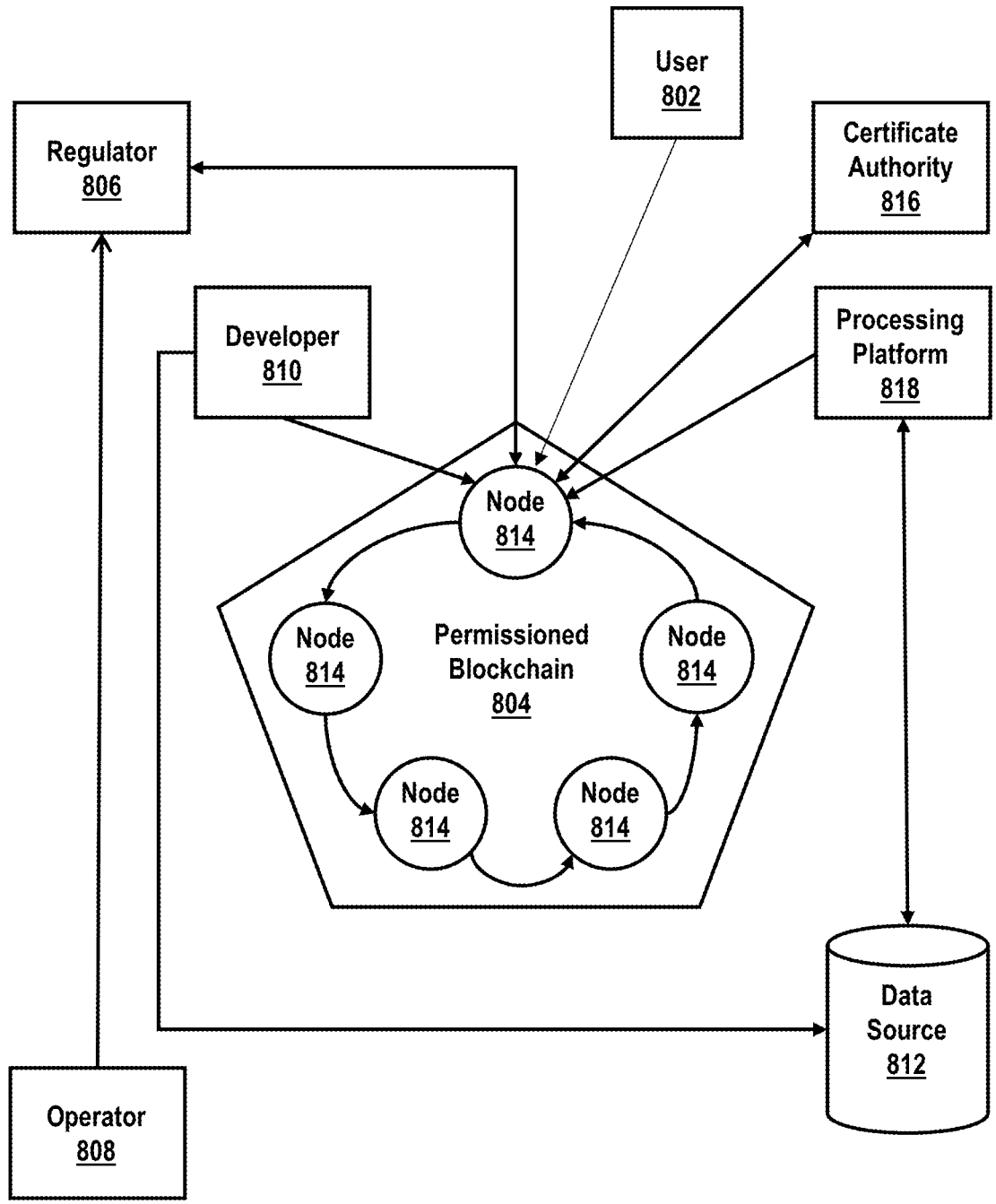
FIG. 8A illustrates a flow diagram, consistent with some embodiments.

FIG. 8A illustrates an example of a permissioned blockchain network, which features a distributed, decentralized peer-to-peer architecture, consistent with some embodiments. In this example, a blockchain user 802 may initiate a transaction to the permissioned blockchain 804. In this example, the transaction may be a deploy, invoke, or query, and may be issued through a client-side application leveraging an SDK, directly through an API, etc. Networks may provide access to a regulator 806, such as an auditor. A blockchain network operator 808 manages member permissions, such as enrolling the regulator 806 as an "auditor" and the blockchain user 802 as a "client." An auditor may be restricted only to querying the ledger, whereas a client may be authorized to deploy, invoke, and query certain types of chaincode.

A blockchain developer 810 can write chaincode and client-side applications in some embodiments. The blockchain developer 810 in these embodiments may deploy chaincode directly to the network through an interface. To include credentials from a traditional data source 812 in chaincode, the developer 810 may use an out-of-band connection to access the data. In this example, the blockchain user 802 may connect to the permissioned blockchain 804 through a peer node 814. Before proceeding with any transactions, the peer node 814 may retrieve the user's enrollment and transaction certificates from a certificate authority 816, which manages user roles and permissions. In some embodiments, blockchain users must possess these digital certificates in order to transact on the permissioned blockchain 804. In other embodiments, blockchain users may be authenticated using other techniques, such as via distributed chains of trust. Meanwhile, a user attempting to utilize chaincode may be required to verify their credentials on the traditional data source 812. Chaincode may use an out-of-band connection to this data through a traditional processing platform 818 to confirm the user's authorization.

Figure 8B:
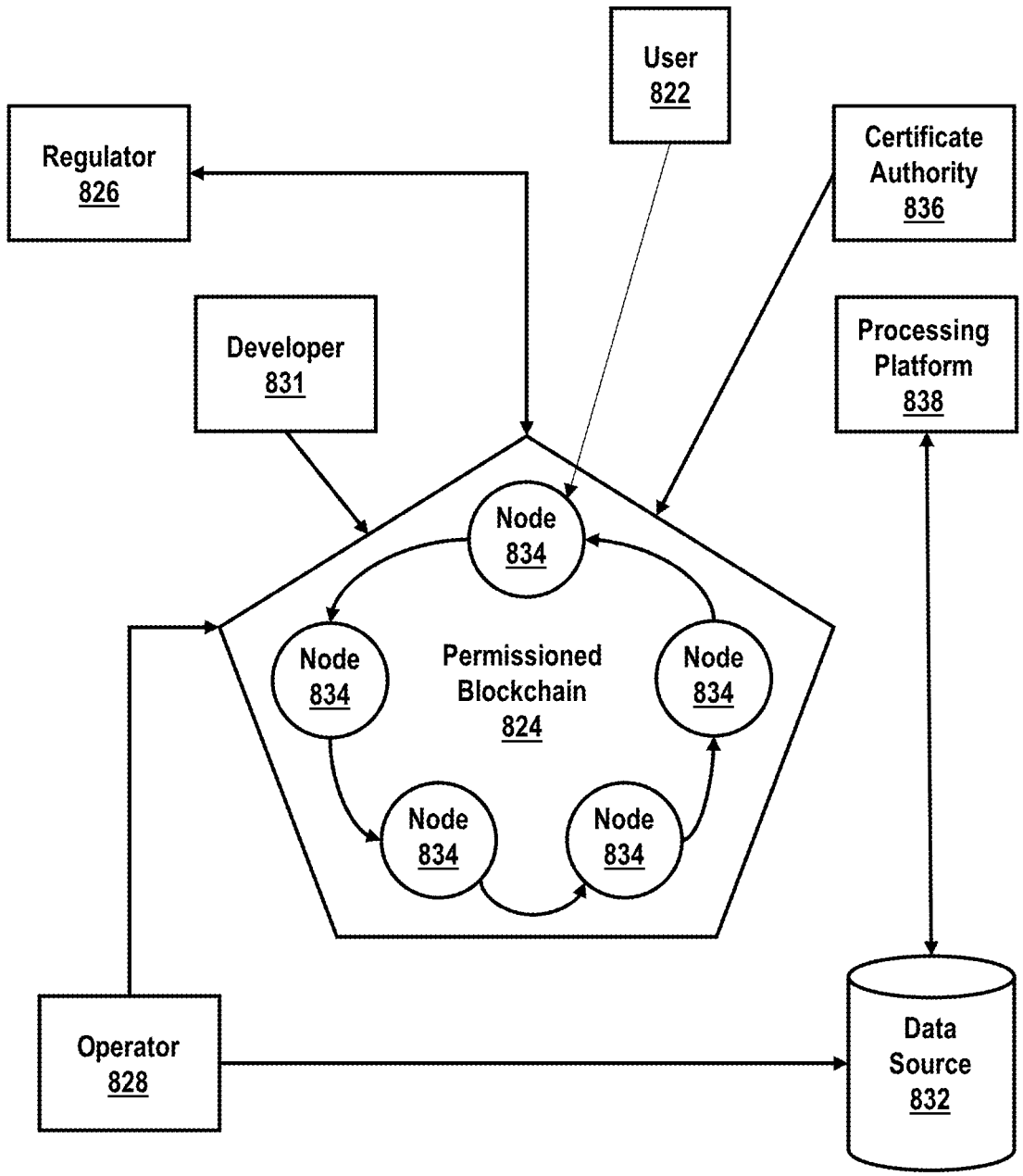
FIG. 8B illustrates a further flow diagram, consistent with some embodiments.

FIG. 8B illustrates another example of a permissioned blockchain network, which features a distributed, decentralized peer-to-peer architecture, consistent with some embodiments. In this example, a blockchain user 822 may submit a transaction to the permissioned blockchain 824. In this example, the transaction can be a deploy, invoke, or query, and may be issued through a client-side application leveraging an SDK, directly through an API, etc. Networks may provide access to a regulator 826, such as an auditor. A blockchain network operator 828 manages member permissions, such as enrolling the regulator 826 as an "auditor" and the blockchain user 822 as a "client." An auditor could be restricted only to querying the ledger, whereas a client could be authorized to deploy, invoke, and query certain types of chaincode.

A blockchain developer 831 in these embodiments may write chaincode and client-side applications. The blockchain developer 831 may deploy chaincode directly to the network through an interface. To include credentials from a traditional data source 832 in chaincode, the developer 831 may use an out-of-band connection to access the data. In this example, the blockchain user 822 connects to the network through a peer node 834. Before proceeding with any transactions, the peer node 834 retrieves the user's enrollment and transaction certificates from the certificate authority 836. In some embodiments, blockchain users must possess these digital certificates in order to transact on the permissioned blockchain 824. In other embodiments, blockchain users may be authenticated using other techniques, such as via distributed chains of trust. Meanwhile, a user attempting to utilize chaincode may be required to verify their credentials on the traditional data source 832. Chaincode can use an out-of-band connection to this data through a traditional processing platform 838 to confirm the user's authorization.

Figure 8C:
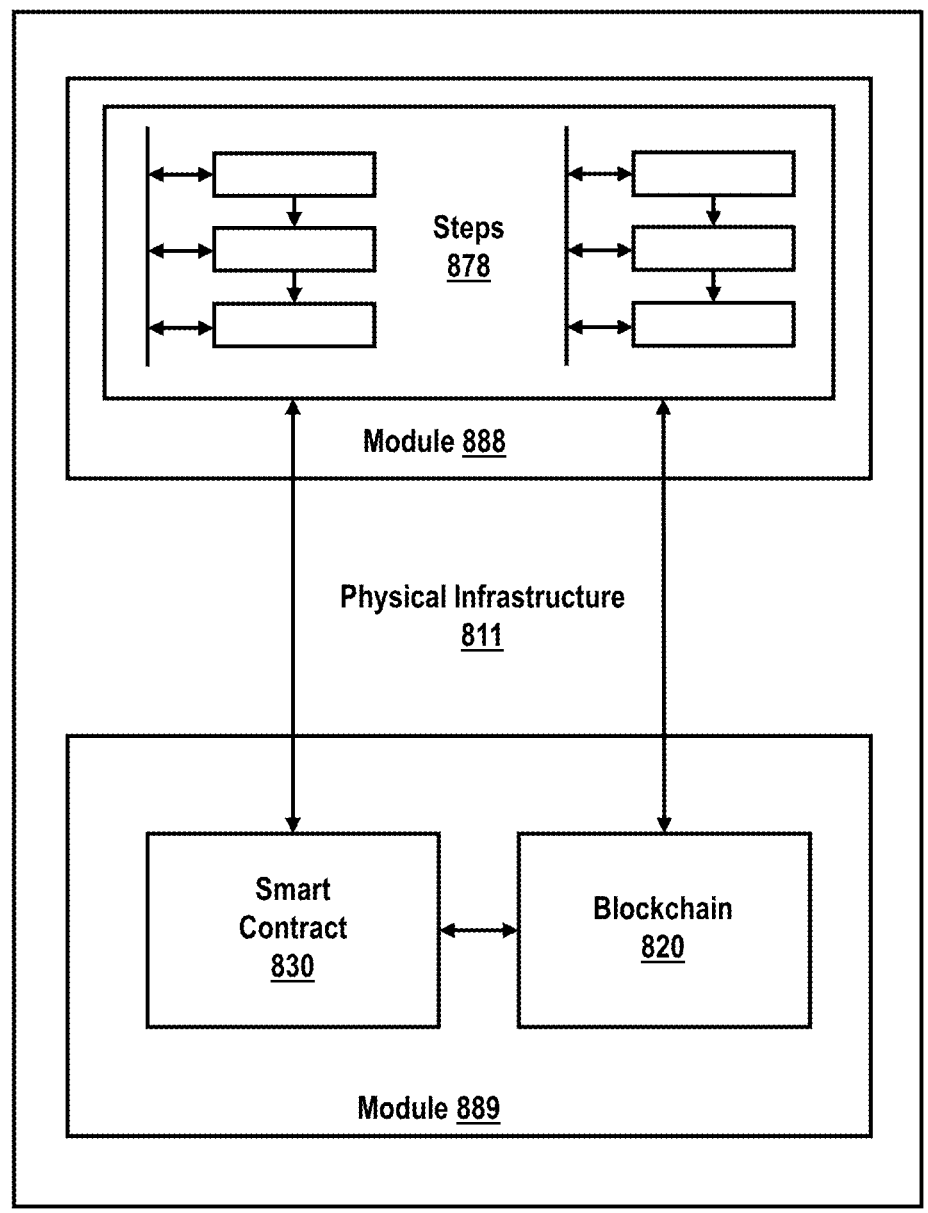
FIG. 8C illustrates an example system configured to perform one or more operations described herein, consistent with some embodiments.

FIG. 8C illustrates an example system that includes a physical infrastructure 811 configured to perform various operations, consistent with some embodiments. Referring to FIG. 6C, the physical infrastructure 811 includes a module 888 and a module 889. The module 819 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical infrastructure 811, the module 888, and the module 889 may include one or more computers, servers, processors, memories, and/or wireless communication devices. Further, the module 888 and the module 889 may be the same module.

Figure 8D:
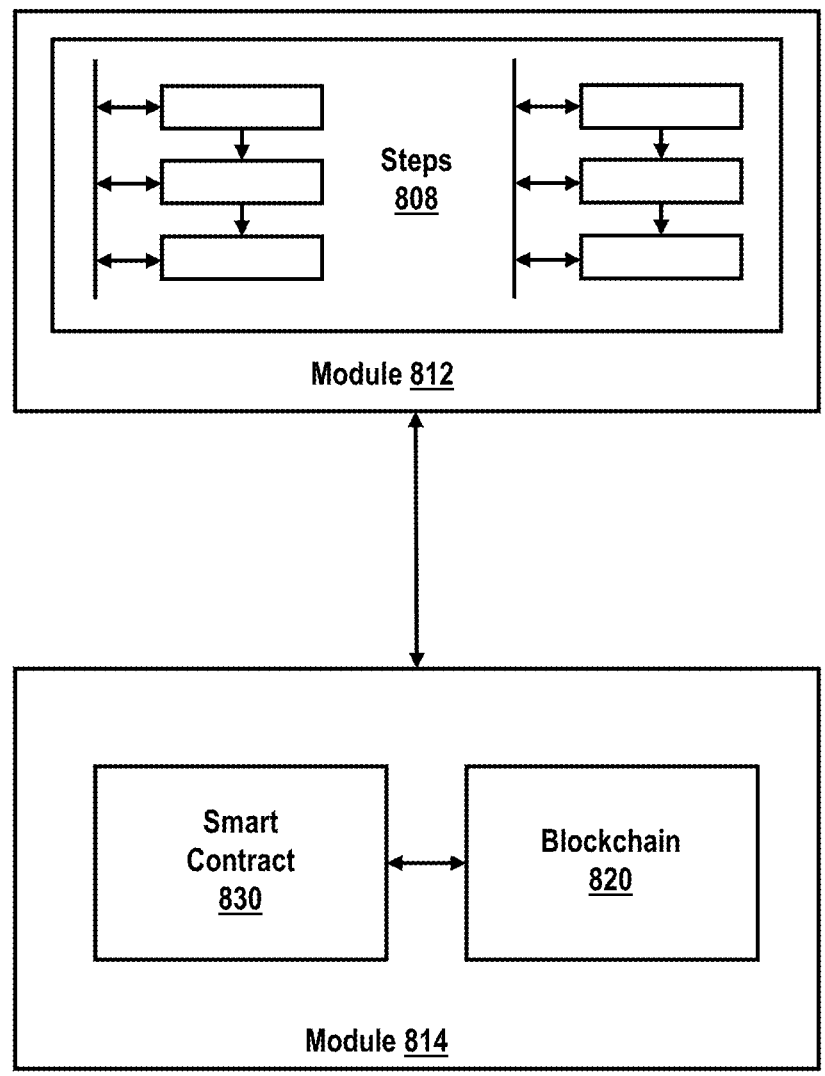
FIG. 8D illustrates another example system configured to perform one or more operations described herein, consistent with some embodiments.

FIG. 8D illustrates another example system configured to perform various operations, consistent with some embodiments. Referring to FIG. 8D, the system includes a module 812 and a module 814. The module 814 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical module 812 and the module 814 may include one or more computers, servers, processors, memories, and/or wireless communication devices. Further, the module 812 and the module 814 may be the same module.

Figure 8E:
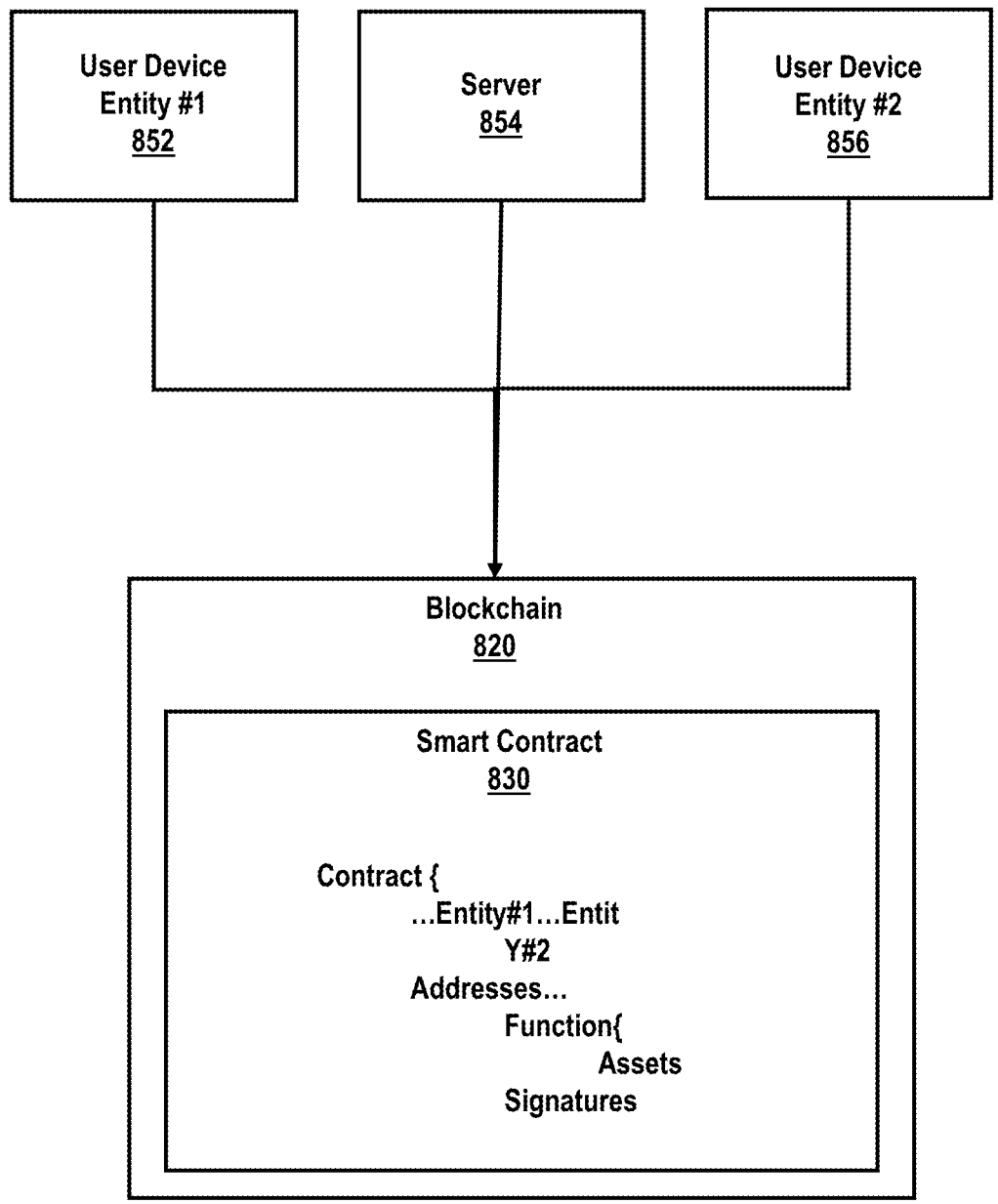
FIG. 8E illustrates a further example system configured to utilize a smart contract, consistent with some embodiments.

FIG. 8E illustrates an example system configured to utilize a smart contract configuration among contracting parties and a mediating server configured to enforce the smart contract terms on the blockchain 820, consistent with some embodiments. Referring to FIG. 8E, the configuration may represent a communication session, an asset transfer session, or a process or procedure that is driven by a smart contract 830, which explicitly identifies one or more user devices 852 and/or 856. The execution, operations, and results of the smart contract execution may be managed by a server 854. Content of the smart contract 830 may require digital signatures by one or more of the entities 852 and 856, which are parties to the smart contract transaction. The results of the smart contract execution may be written to a blockchain 820 as a blockchain transaction. The smart contract 830 resides on the blockchain 820, which may reside on one or more computers, servers, processors, memories, and/or wireless communication devices.

Figure 8F:
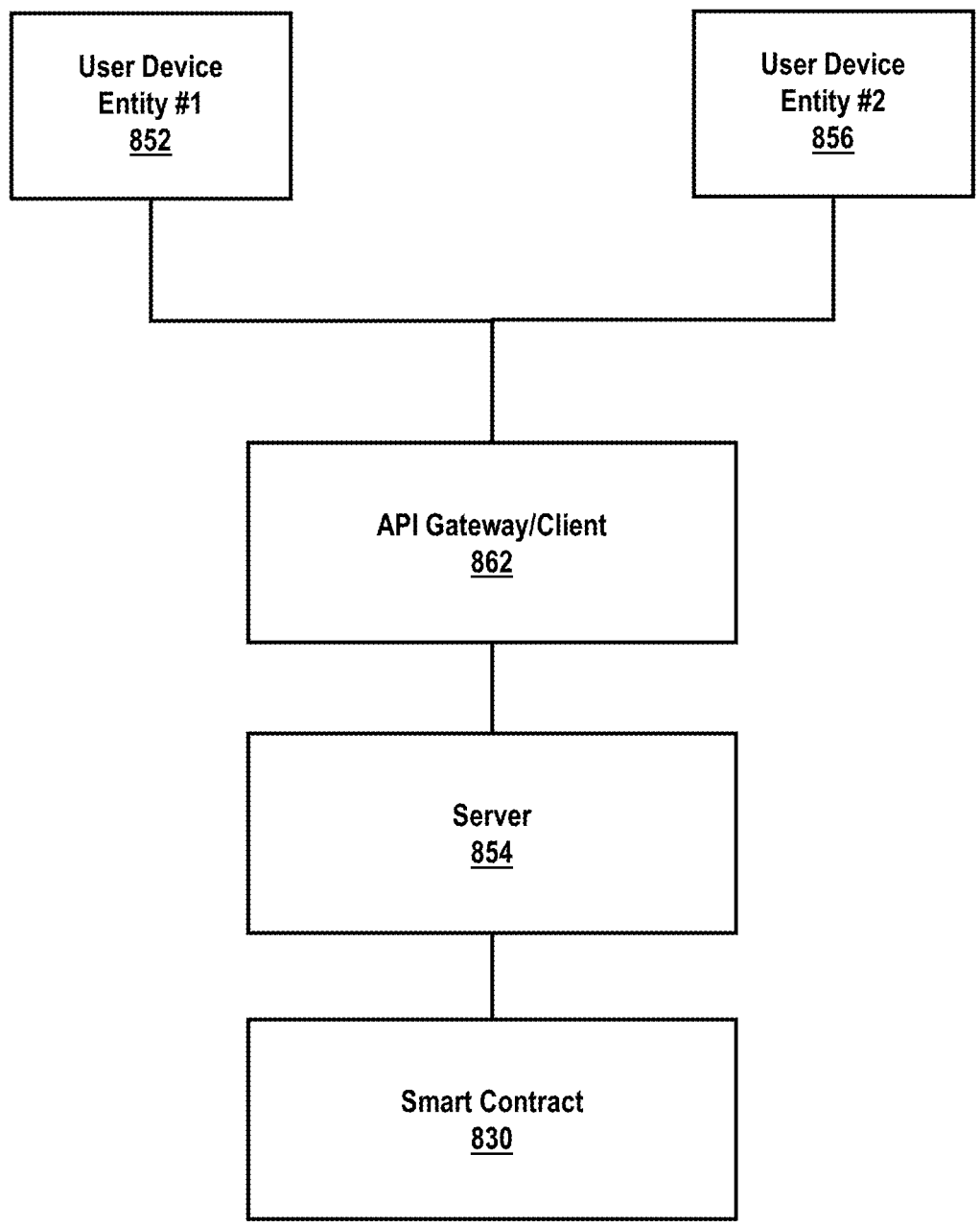
FIG. 8F illustrates a system including a blockchain, consistent with some embodiments.

FIG. 8F illustrates a system 860, including a blockchain, consistent with some embodiments. Referring to the example of FIG. 8D, an application programming interface (API) gateway 862 provides a common interface for accessing blockchain logic (e.g., smart contract 830 or other chaincode) and data (e.g., distributed ledger, etc.). In this example, the API gateway 862 is a common interface for performing transactions (invoke, queries, etc.) on the blockchain by connecting one or more entities 852 and 856 to a blockchain peer (i.e., server 854). Here, the server 854 is a blockchain network peer component that holds a copy of the world state and a distributed ledger allowing clients 852 and 856 to query data on the world stage as well as submit transactions into the blockchain network where depending on the smart contract 830 and endorsement policy, endorsing peers will run the smart contracts 830.

Block Processing

Figure 9A:
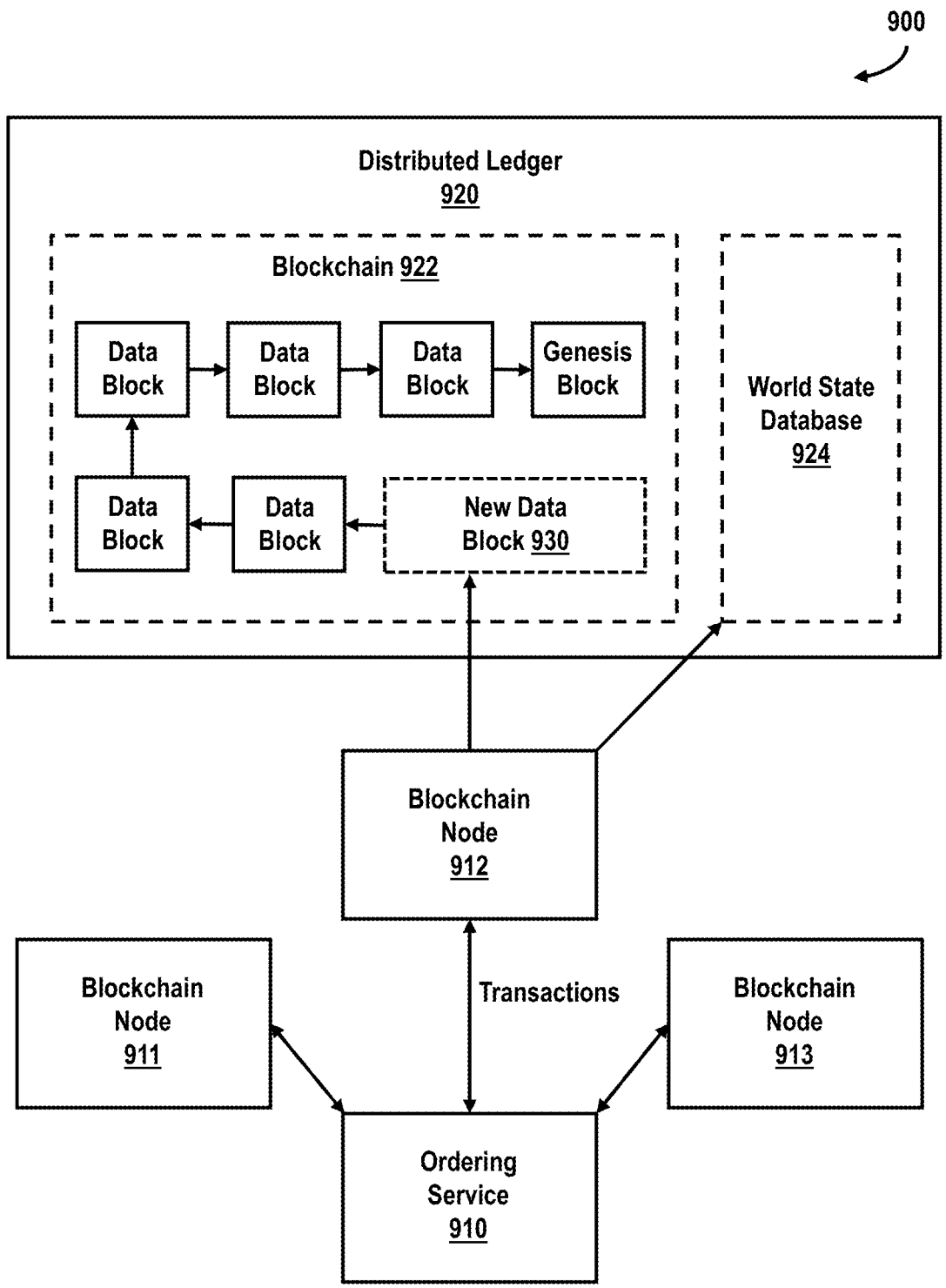
FIG. 9A illustrates a process for a new block being added to a distributed ledger, according to example embodiments.

FIG. 9A illustrates a process 900 of a new data block 930 being added to a distributed ledger 920, consistent with some embodiments, and FIG. 7B illustrates contents of a new data block 930 for blockchain, consistent with some embodiments. The new data block 930 may contain document linking data.

Referring to FIG. 9A, clients (not shown) may submit transactions to blockchain nodes 911, 912, and/or 913. Clients may be instructions received from any source to enact activity on the blockchain 922. As an example, clients may be applications that act on behalf of a requester, such as a device, person, or entity to propose transactions for the blockchain. The plurality of blockchain peers (e.g., blockchain nodes 911, 912, and 913) may maintain a state of the blockchain network and a copy of the distributed ledger 920. Different types of blockchain nodes/peers may be present in the blockchain network including endorsing peers which simulate and endorse transactions proposed by clients and committing peers which verify endorsements, validate transactions, and commit transactions to the distributed ledger 920. In some embodiments, the blockchain nodes 911, 912, and 913 may perform the role of endorser node, committer node, or both.

Figure 9B:
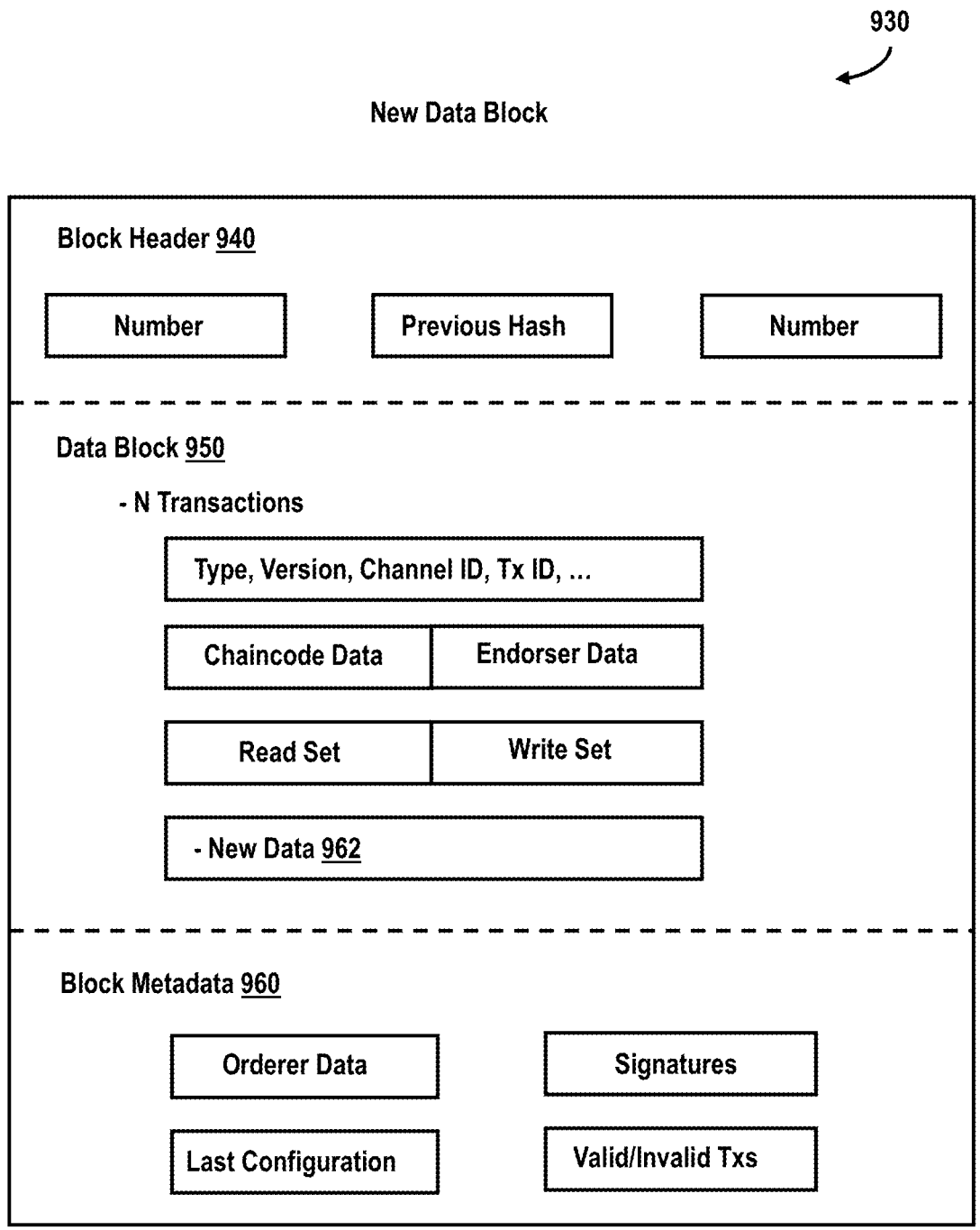
FIG. 9B illustrates contents of a new data block, according to example embodiments.

The distributed ledger 920 may include a blockchain which stores immutable, sequenced records in blocks, and a state database 924 (current world state) maintaining a current state of the blockchain 922. One distributed ledger 920 may exist per channel and each peer maintains its own copy of the distributed ledger 920 for each channel of which they are a member. The blockchain 922 may be a transaction log, structured as hash-linked blocks where each block contains a sequence of N transactions. Blocks may include various components such as shown in FIG. 9B. The linking of the blocks (shown by arrows in FIG. 9A) may be generated by adding a hash of a prior block's header within a block header of a current block. In this way, all transactions on the blockchain 922 may be sequenced and cryptographically linked together preventing tampering with blockchain data without breaking the hash links. Furthermore, because of the links, the latest block in the blockchain 922 represents every transaction that has come before it. The blockchain 922 may be stored on a peer file system (local or attached storage), which supports an append-only blockchain workload.

The current state of the blockchain 922 and the distributed ledger 920 may be stored in the state database 924. Here, the current state data represents the latest values for all keys ever included in the chain transaction log of the blockchain 922. Chaincode invocations execute transactions against the current state in the state database 924. To make these chaincode interactions more efficient, the latest values of all keys may be stored in the state database 924. The state database 924 may include an indexed view into the transaction log of the blockchain 922, it can therefore be regenerated from the chain at any time. The state database 924 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 912 is a committing peer that has received a new data new data block 930 for storage on blockchain 922. The first block in the blockchain may be referred to as a genesis block, which includes information about the blockchain, its members, the data stored therein, etc.

The ordering service 910 may be made up of a cluster of ordering nodes. The ordering service 910 in some embodiments may not process transactions, smart contracts, or maintain the shared ledger. Rather, the ordering service 910 in these embodiments may accept the endorsed transactions and specify the order in which those transactions are committed to the distributed ledger 920. The architecture of the blockchain network may be designed such that the specific implementation of "ordering" (e.g., Solo, Kafka, BFT, etc.) becomes a pluggable component.

Transactions in some embodiments may be written to the distributed ledger 920 in a consistent order. The order of transactions in these embodiments may be established to ensure that the updates to the state database 924 are valid when they are committed to the network. Unlike a cryptocurrency blockchain system (e.g., Bitcoin, etc.), where ordering occurs through the solving of a cryptographic puzzle, or mining, in this example the parties of the distributed ledger 920 may choose the ordering mechanism that best suits that network.

In some embodiments, when the ordering service 910 initializes a new data block 930, the new data block 930 may be broadcast to committing peers (e.g., blockchain nodes 911, 912, and 913). In response, each committing peer may validate the transaction within the new data block 930 by checking to make sure that the read set and the write set still match the current world state in the state database 924. Specifically, the committing peer may determine whether the read data that existed when the endorsers simulated the transaction is identical to the current world state in the state database 924. When the committing peer validates the transaction, the transaction may be written to the blockchain 922 on the distributed ledger 920, and the state database 924 may be updated with the write data from the read-write set. In some embodiments, if a transaction fails (e.g., if the committing peer finds that the read-write set does not match the current world state in the state database 924), the transaction ordered into a block may still be included in that block, but marked as invalid, and the state database 924 not updated.

Referring to FIG. 9B, a new data block 930 (also referred to as a data block) that is stored on the blockchain 922 of the distributed ledger 920 may include multiple data segments in some embodiments, such as a block header 940, block data 950, and block metadata 960. It should be appreciated that the various depicted blocks and their contents, such as new data block 930 and its contents, shown in FIG. 9B are merely examples and are not meant to limit the scope of the example embodiments. The new data block 930 may store transactional information of N transaction(s) (e.g., 1, 10, 100, 200, 1000, 2000, 3000, etc.) within the block data 950. The new data block 930 may also include a link to a previous block (e.g., on the blockchain 922 in FIG. 9A) within the block header 940. In particular, the block header 940 may include a hash of a previous block's header. The block header 940 may also include a unique block number, a hash of the block data 950 of the new data block 930, and the like. The block number of the new data block 930 may be unique and assigned in various orders, such as an incremental/sequential order starting from zero.

The block data 950 may store transactional information of each transaction that is recorded within the new data block 930. For example, the transaction data may include one or more of: a type of the transaction, a version, a timestamp, a channel ID of the distributed ledger 920, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 950 may also store new data 962, which adds additional information to the hash-linked chain of blocks in the blockchain 922. The additional information may include one or more of the steps, features, processes and/or actions described or depicted herein. Accordingly, the new data 962 may be stored in an immutable log of blocks on the distributed ledger 920. Some of the benefits of storing such new data 962 are reflected in the various embodiments disclosed and depicted herein.

Although in FIG. 9B the new data 962 is depicted in the block data 950, it could also be located in the block header 940 or the block metadata 960 in some embodiments. The new data 962 may also include a document composite key that is used for linking the documents within an organization.

The block metadata 960 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 912) may add validity/invalidity information based on an endorsement policy, verification of read/write sets, and the like. The transaction filter may include a byte array of a size equal to the number of transactions in the block data 950 and a validation code identifying whether a transaction was valid/invalid.

Figure 9C:
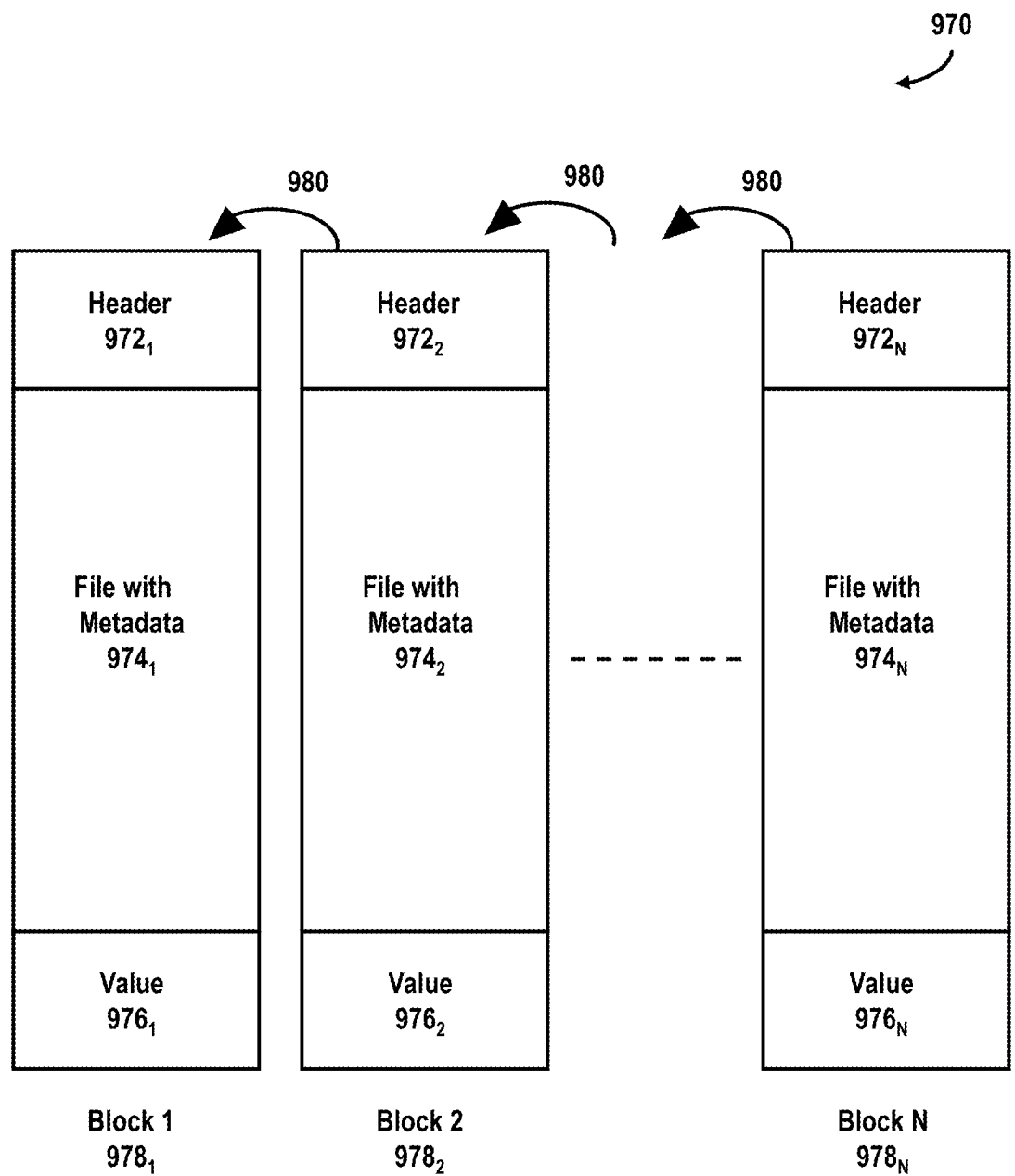
FIG. 9C illustrates a blockchain for digital content, according to example embodiments.

FIG. 9C illustrates an embodiment of a blockchain 970 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 970 includes a number of blocks $978_1$, $978_2$, ... $978_N$ cryptographically linked in an ordered sequence, where $N \geq 1$. The encryption used to link the blocks $978_1$, $978_2$, ... $978_N$ may be any of a number of keyed or un-keyed Hash functions. In one embodiment, the blocks $978_1$, $978_2$, ... $978_N$ are subject to a hash function that produces n-bit alphanumeric outputs (where n is 256 or another number) from inputs that are based on information in the blocks. Examples of such a hash function include, but are not limited to: an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $978_1$, $978_2$, ..., $978_N$ may be cryptographically linked by a function that is different from a hash function. For purposes of illustration, the following description is made with reference to a hash function, e.g., SHA-2.

Each of the blocks $978_1$, $978_2$, ..., $978_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $978_1$ in the blockchain is referred to as the genesis block and may include the header $972_1$, original file $974_1$, and an initial value $976_1$. The hashing scheme used for the genesis block, and indeed in all subsequent blocks, may vary. For example, all the information in the first block $978_1$ may be hashed together and at one time, or each or a portion of the information in the first block $978_1$ may be separately hashed, and then a hash of the separately hashed portions may be performed.

The header $972_1$ may include one or more initial parameters, which, for example, may include a version number, timestamp, nonce, root information, difficulty level, consensus protocol, duration, media format, source, descriptive keywords, and/or other information associated with original file $974_1$ and/or the blockchain. The header $972_1$ may be generated automatically (e.g., by blockchain network managing software) or manually by a blockchain participant. Unlike the header in other blocks $978_2$ to $978_N$ in the blockchain, the header $972_1$ in the genesis block may not reference a previous block, simply because there is no previous block.

The original file $974_1$ in the genesis block may be, for example, data as captured by a device with or without processing prior to its inclusion in the blockchain. The original file $974_1$ may be received through the interface of the system from the device, media source, or node. The original file $974_1$ may be associated with metadata, which, for example, may be generated by a user, the device, and/or the system processor, either manually or automatically. The metadata may be included in the first block $978_1$ in association with the original file $974_1$.

The value $976_1$ in the genesis block may be an initial value generated based on one or more unique attributes of the original file $974_1$. In one embodiment, the one or more unique attributes may include the hash value for the original file $974_1$, metadata for the original file $974_1$, and other information associated with the file. In one implementation, the initial value $976_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $978_2$ to $978_N$ in the blockchain also have headers, files, and values. However, unlike the header $972_1$ of the first block, each of the headers $972_2$ to $972_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 980, to establish an auditable and immutable chain-of-custody.

Each of the header $972_2$ to $972_N$ in the other blocks may also include other information, e.g., version number, timestamp, nonce, root information, difficulty level, consensus protocol, and/or other parameters or information associated with the corresponding files and/or the blockchain in general.

The files $974_2$ to $974_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing, which involves analyzing a file, may include, for example, appending, including, or otherwise associating various analytics, statistics, or other information associated with the file.

The values in each of the other blocks $976_2$ to $976_N$ in the other blocks are unique values and are all different as a result of the processing performed. For example, the value in any one block corresponds to an updated version of the value in the previous block. The update is reflected in the hash of the block to which the value is assigned. The values of the blocks, therefore, provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block, including the redacted file, will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 9D:
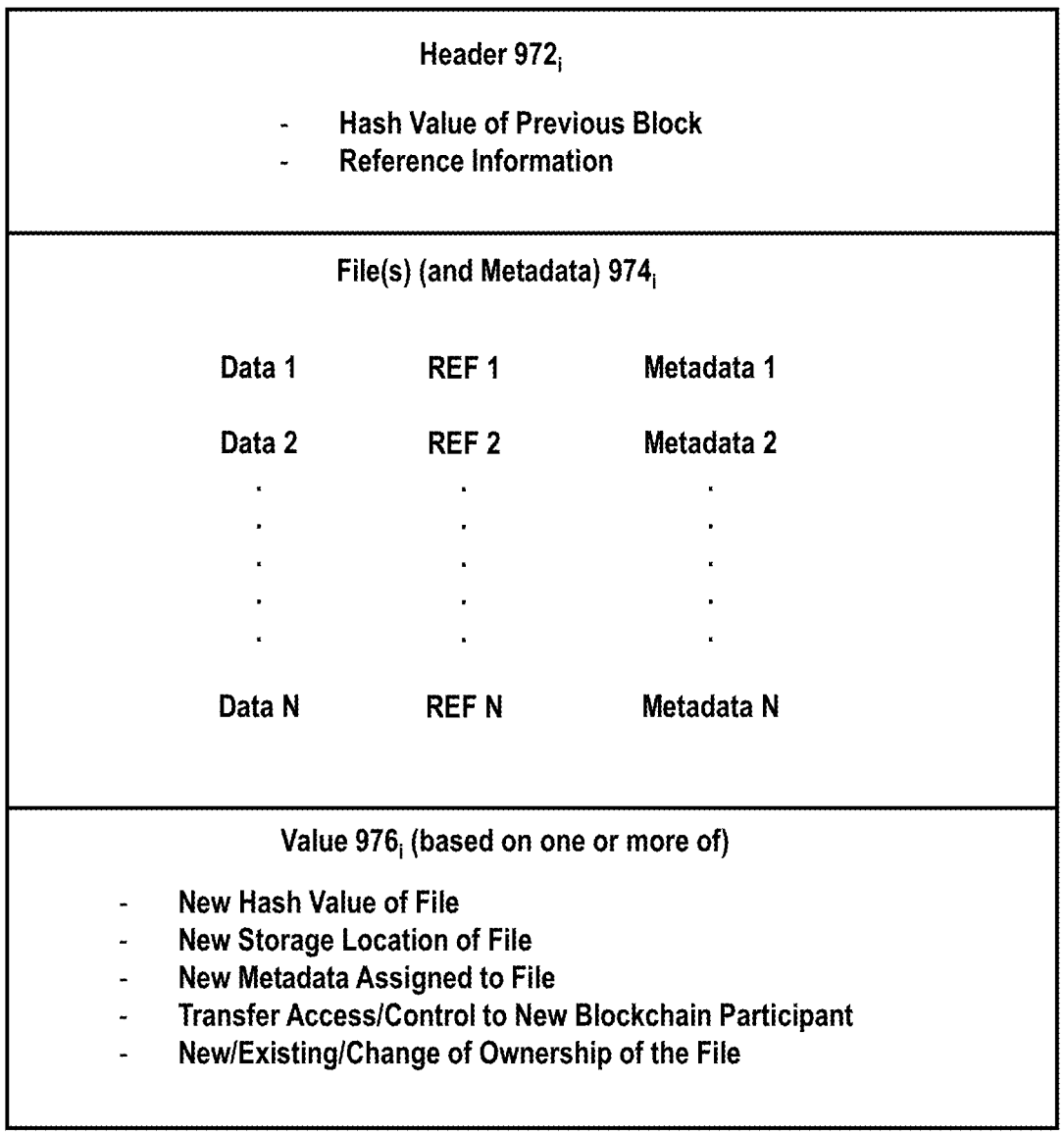
FIG. 9D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 9D illustrates an embodiment of a block, which may represent the structure of the blocks in the blockchain 990, consistent with some embodiments. The block, $Block_i$, may include a header $972_i$, a file $974_i$, and a value $976_i$.

The header $972i$ may include a hash value of a previous block $Block_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $974_i$ may include a plurality of data, such as Data 1, Data 2, ..., Data N in sequence. The data are tagged with Metadata 1, Metadata 2, ..., Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, ..., $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $976_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 970 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for configuring a blockchain network, comprising:
   initializing, by a delineate node of the blockchain network, pass-through services;
   receiving, at the delineate node, a registration request from a device;
   validating the device, by the delineate node in response to the registration request, using a physical uncloneable function (PUF) response received from the device, wherein the PUF automatically provides a cryptographic proof for immutable registration key previously measured or calculated by a manufacturer of the IoT device and previously communicated to the delineate node by a secure channel, and wherein the validating comprises:
      sending, by the delineate node, a challenge to the device; and
      receiving, by the delineate node, the PUF response from the device;
   registering, by a processor of the delineate node in response to the validating, the device in a virtual profile; and
   performing, by the processor of the delineate node, a pass-through service for the registered device.

2. The method of claim 1, further comprising, by the delineate node, updating a transaction correlation table on behalf of the registered device, wherein the transaction correlation table contains a record of blockchain functions associated with the registered device.

3. The method of claim 2, wherein the blockchain functions comprise maintaining an endorsement policy and a delegate authority proof for the blockchain network.

4. The method of claim 2, further comprising:
   receiving, at the delineate node, a membership services directive from a node in the blockchain network directed to the registered device; and
   by the delineate node, in response to the membership services directive, updating the transaction correlation table for the registered device.

5. The method of claim 2, further comprising:
   receiving, at the delineate node, a membership services directive from the registered device directed to the blockchain network; and
   by the delineate node, in response to the membership services directive, updating the transaction correlation table for the registered device.

6. The method of claim 1, wherein the pass-through service comprises creating a channel for communication between peers on the blockchain network.

7. The method of claim 1, wherein the pass-through service comprises facilitating a transaction on behalf of the registered device.

8. The method of claim 1, wherein the pass-through service comprises communication between the delineate node on behalf of the registered device and other nodes in the blockchain network.

9. The method of claim 8, wherein the pass-through service further comprises proxying, by the delineate node, all communication between the registered device and the other nodes in the blockchain network.

10. The method of claim 1, wherein the registration further comprises registering the device with a membership service of the blockchain network.

11. The method of claim 10, wherein the registration enables the device to be registered as a peer node on a private blockchain network.

12. The method of claim 1, wherein the virtual profile includes an encryption key pair for the registered device, and wherein the encryption key pair is generated by the delineate node and stored in a secure vault associated with the delineate node.

13. The method of claim 12, wherein the secure vault comprises a hardware security architecture.

14. The method of claim 1, wherein the PUF comprises a physically-defined digital fingerprint associated with the device.

15. The method of claim 14, and wherein the immutable registration key is used as an identity mechanism in the blockchain network.

16. The method of claim 1, wherein the registered device is an Internet-of-Things (IoT) device and wherein the delineate node maintains a distributed ledger on behalf of the registered IoT device.

17. The method of claim 1, wherein the delineate node comprises a specialized hardware co-processor for performing the pass-through service.

18. The method of claim 1, further comprising generating, by the delineate node, a blockchain signing key for the device.

19. The method of claim 1, further comprising storing the generated blockchain signing key in a secure vault associated with the delineate node.

20. A computer program product for integrating device identity into a permissioning framework of a blockchain network, the computer program product comprising a computer readable storage medium having program instructions embodied therewith, the program instructions executable by a processor to cause the processor to:

provide, by a node, pass-through security services, wherein the pass-through security services include a trusted registration of peers in the blockchain network;

receive, at the node, a registration request from a device;

validate the device, by the node in response to the registration request, using a physical uncloneable function (PUF) response received from the device, wherein the PUF automatically provides a cryptographic proof for immutable registration key previously measured or calculated by a manufacturer of the IoT device and previously communicated to the delineate node by a secure channel, and wherein the validating comprises:

sending, by the node, a challenge to the device; and receiving, by the node, the PUF response from the device;

register, by the node in response to the validation, the device as a registered node on the blockchain network, wherein the registering includes creating, by the node based on the registering, a virtual profile for the registered device in a secure enclave;

maintain, by the node, a transaction correlation table for the registered device, wherein the transaction correlation table contains a record of blockchain essentials associated with the registered device, wherein the blockchain essentials include channels, endorsement policies, and delegate authority proofs; and carry out, by the node, transaction commitment and client communication on behalf of the registered device.

\* \* \* \* \*